(12) United States Patent
Michalski et al.

(10) Patent No.: US 12,012,221 B2
(45) Date of Patent: Jun. 18, 2024

(54) METHODS AND APPARATUS FOR UNMANNED AERIAL VEHICLE LANDING AND LAUNCH

(71) Applicant: Airogistic, L.L.C., Austin, TX (US)

(72) Inventors: Jeff Michalski, Austin, TX (US); Michael Foley, Austin, TX (US)

(73) Assignee: Airogistic, L.L.C., Dripping Springs, TX (US)

( * ) Notice: Subject to any disclaimer, the term of this patent is extended or adjusted under 35 U.S.C. 154(b) by 331 days.

(21) Appl. No.: 17/077,766

(22) Filed: Oct. 22, 2020

(65) Prior Publication Data

US 2021/0039807 A1 Feb. 11, 2021

Related U.S. Application Data

(60) Continuation of application No. 15/804,609, filed on Nov. 6, 2017, now Pat. No. 10,843,814, which is a
(Continued)

(51) Int. Cl.
| | |
|---|---|
| *B64C 39/02* | (2023.01) |
| *B64D 45/04* | (2006.01) |
| *G05D 1/00* | (2006.01) |
| *G08G 5/00* | (2006.01) |
| *G08G 5/02* | (2006.01) |
| *B64U 10/00* | (2023.01) |
| *B64U 10/13* | (2023.01) |
| *B64U 70/00* | (2023.01) |
| *B64U 80/00* | (2023.01) |
| *B64U 101/00* | (2023.01) |

(52) U.S. Cl.
CPC ............ *B64D 45/04* (2013.01); *B64C 39/024* (2013.01); *G05D 1/0669* (2013.01); *G05D 1/0676* (2013.01); *G08G 5/0013* (2013.01); *G08G 5/0026* (2013.01); *G08G 5/0065* (2013.01); *G08G 5/0069* (2013.01); *G08G 5/025* (2013.01); *B64U 10/00* (2023.01); *B64U 10/13* (2023.01); *B64U 70/00* (2023.01); *B64U 80/00* (2023.01); *B64U 2101/00* (2023.01); *B64U 2201/10* (2023.01)

(58) Field of Classification Search
None
See application file for complete search history.

(56) References Cited

U.S. PATENT DOCUMENTS

| | | | |
|---|---|---|---|
| 2014/0032034 A1* | 1/2014 | Raptopoulos | H04B 7/18506 701/25 |
| 2015/0239578 A1* | 8/2015 | McGeer | B64F 1/04 901/31 |

(Continued)

OTHER PUBLICATIONS

National Geodetic Survey (NOAA), "National CORS", <http://www.ngs.noaa.gov/CORS/>, 1999 (Year: 1999).*

*Primary Examiner* — Jelani A Smith
*Assistant Examiner* — Davin Seol
(74) *Attorney, Agent, or Firm* — Weisberg I.P. Law, P.A.

(57) ABSTRACT

An unmanned aerial vehicle (UAV), a stand for launching, landing, testing, refueling and recharging a UAV, and methods for testing, landing and launching the UAV are disclosed. Further, embodiments may include transferring a payload onto or off of the UAV, and loading flight planning and diagnostic maintenance information to the UAV.

19 Claims, 36 Drawing Sheets

Related U.S. Application Data division of application No. 14/800,395, filed on Jul. 15, 2015, now Pat. No. 9,845,165.

(60) Provisional application No. 62/120,090, filed on Feb. 24, 2015, provisional application No. 62/025,191, filed on Jul. 16, 2014.

(56) References Cited

U.S. PATENT DOCUMENTS

| | | | |
|---|---|---|---|
| 2015/0259078 A1* | 9/2015 | Filipovic | G08B 13/19632 |
| | | | 244/114 R |
| 2015/0266575 A1* | 9/2015 | Borko | B64C 39/024 |
| | | | 244/17.23 |
| 2015/0294329 A1* | 10/2015 | Saito | G06Q 30/0261 |
| | | | 705/7.31 |
| 2015/0336669 A1* | 11/2015 | Kantor | G08G 5/0086 |
| | | | 701/3 |
| 2016/0011592 A1* | 1/2016 | Zhang | B60L 53/80 |
| | | | 244/114 R |
| 2016/0257424 A1* | 9/2016 | Stabler | B64F 1/20 |
| 2016/0300495 A1* | 10/2016 | Kantor | H04L 61/5007 |
| 2018/0253981 A1* | 9/2018 | Raptopoulos | G05D 1/104 |
| 2019/0248509 A1* | 8/2019 | Cohen | B64F 1/027 |

* cited by examiner

METHODS AND APPARATUS FOR UNMANNED AERIAL VEHICLE LANDING AND LAUNCH

CROSS REFERENCE TO RELATED APPLICATIONS

This application is a Continuation of U.S. patent application Ser. No. 15/804,609, filed on Nov. 6, 2017, entitled "METHODS AND APPARATUS FOR UNMANNED AERIAL VEHICLE LANDING AND LAUNCH" which is a divisional application of U.S. Utility patent application Ser. No. 14/800,395, filed Jul. 15, 2015, which is related to and claims priority to U.S. Provisional Patent Application Ser. No. 62/025,191, filed Jul. 16, 2014, entitled "VERTICAL LIFT TEST CALIBRATION AND LAUNCH STAND". This application is also related to and claims priority to U.S. Provisional Patent Application Ser. No. 62/120,090, filed Feb. 24, 2015, entitled "METHODS AND APPARATUS FOR UNMANNED AERIAL VEHICLE LANDING AND LAUNCH", the entire contents of all of which are hereby incorporated herein by reference.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
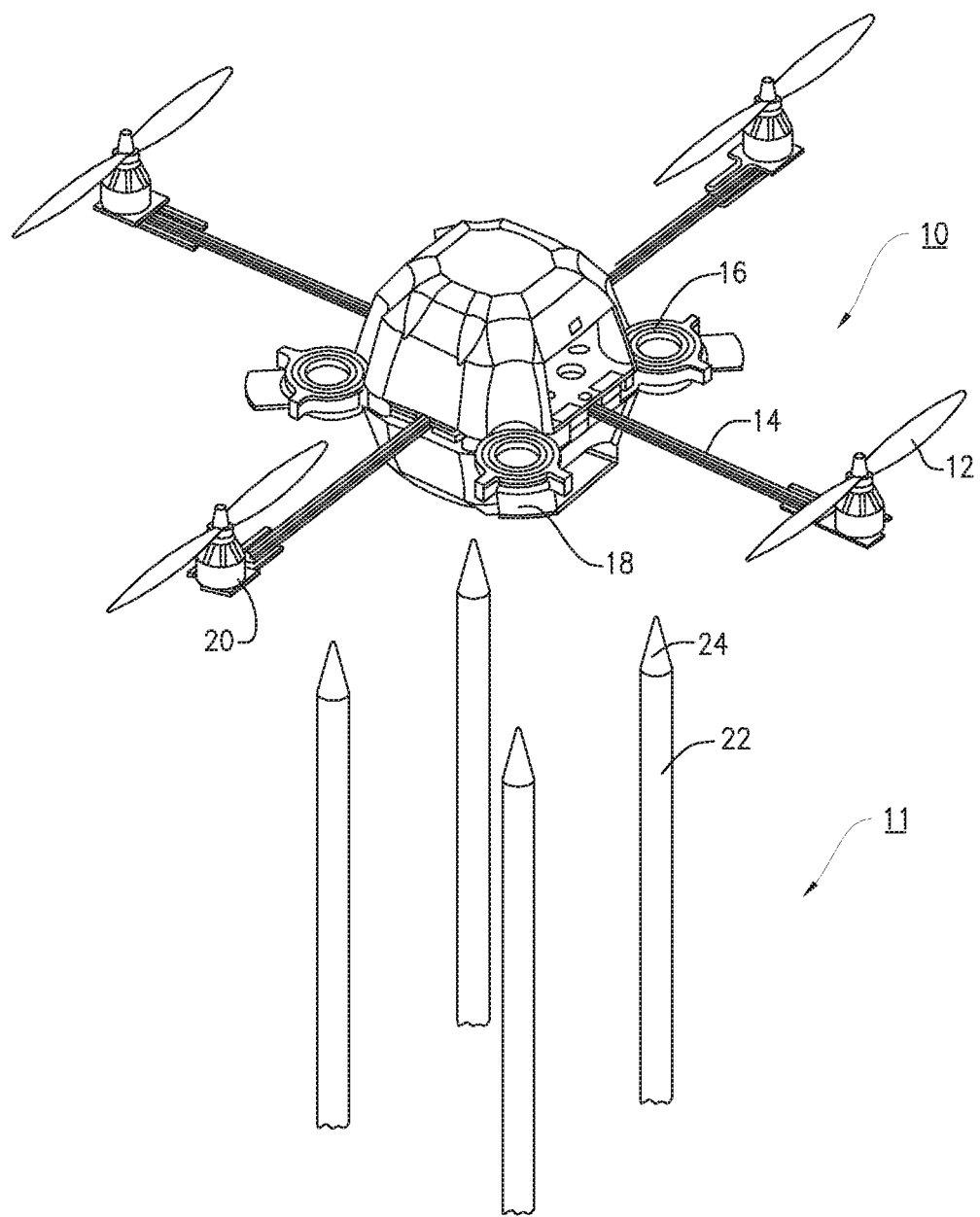
FIG. 1 is an illustration of one embodiment of an unmanned aerial vehicle (UAV) approaching shafts of a stand.

Before describing in detail exemplary embodiments that are in accordance with the present invention, it is noted that the embodiments reside primarily in combinations of apparatus components and processing steps related to unmanned aerial vehicles and charge/launch/landing/test stands. The stands may be stationary, located at fixed locations, or mobile, or mounted to moving vehicles. The stands may be operated individually or in cooperative networks of other stands as described herein. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Embodiments described in this written description include unmanned aerial vehicles (UAVs), a stand for launching, landing, refueling, recharging, starting and testing UAVs, and methods for landing and launching a UAV, as well as methods for loading and unloading a payload of the UAV. Further, embodiments include a drone dome which may be employed to encompass one or more stands and drone drive electronics which may be employed to supplement the propulsion system of a UAV during landing and/or take-off.

FIG. 1 is an illustration of one embodiment of a UAV 10. In this embodiment, two or more propellers 12 rotate to maneuver the UAV 10. Each propeller 12 is mounted at an end of a rail 14. About the intersection of the rails 14 are two or more collars or fittings 16 that are received by two or more shafts 32 of a stand 11 that is used for launching, landing, testing, refueling and/or recharging the UAV 10. In some embodiments, an inertial measurement and control unit (IMCU) (not shown) for control of the flight of the UAV 10 is mounted on the UAV.

The IMCU on the UAV 10 may send, via an antenna or optical link, navigation and speed signals to a ground station or stand 11 that receives pitch, roll, up, down, yaw, acceleration and deceleration data of the UAV 10 as measured by the IMCU of the UAV 10. The IMCU may include a gyroscope, accelerometers and/or magnetometers, altimeters and/or other sensors, such as optical, image and/or ultrasonic sensors that enable navigational control of a UAV. Further, the UAV 10 or the stand 11, discussed below, may include a laser altimeter to determine an altitude of the UAV 10 above the stand 11. In some embodiments, a calibration IMCU may be incorporated on the UAV 10 along with the reference UAV IMCU. The calibration IMCU measurements may be compared to the reference UAV IMCU to calibrate the reference UAV IMCU. Near each collar 16 may be a reflector 18 which reflects a laser light beam of a laser altimeter used for determining the height of the UAV 10. In alternative embodiments, an UAV mounted altimeter, an optical, ultrasonic or laser range finder or GPS may be employed with RF communications to transmit the relative position of the UAV in comparison to the location of the UAV stands.

Figure 2:
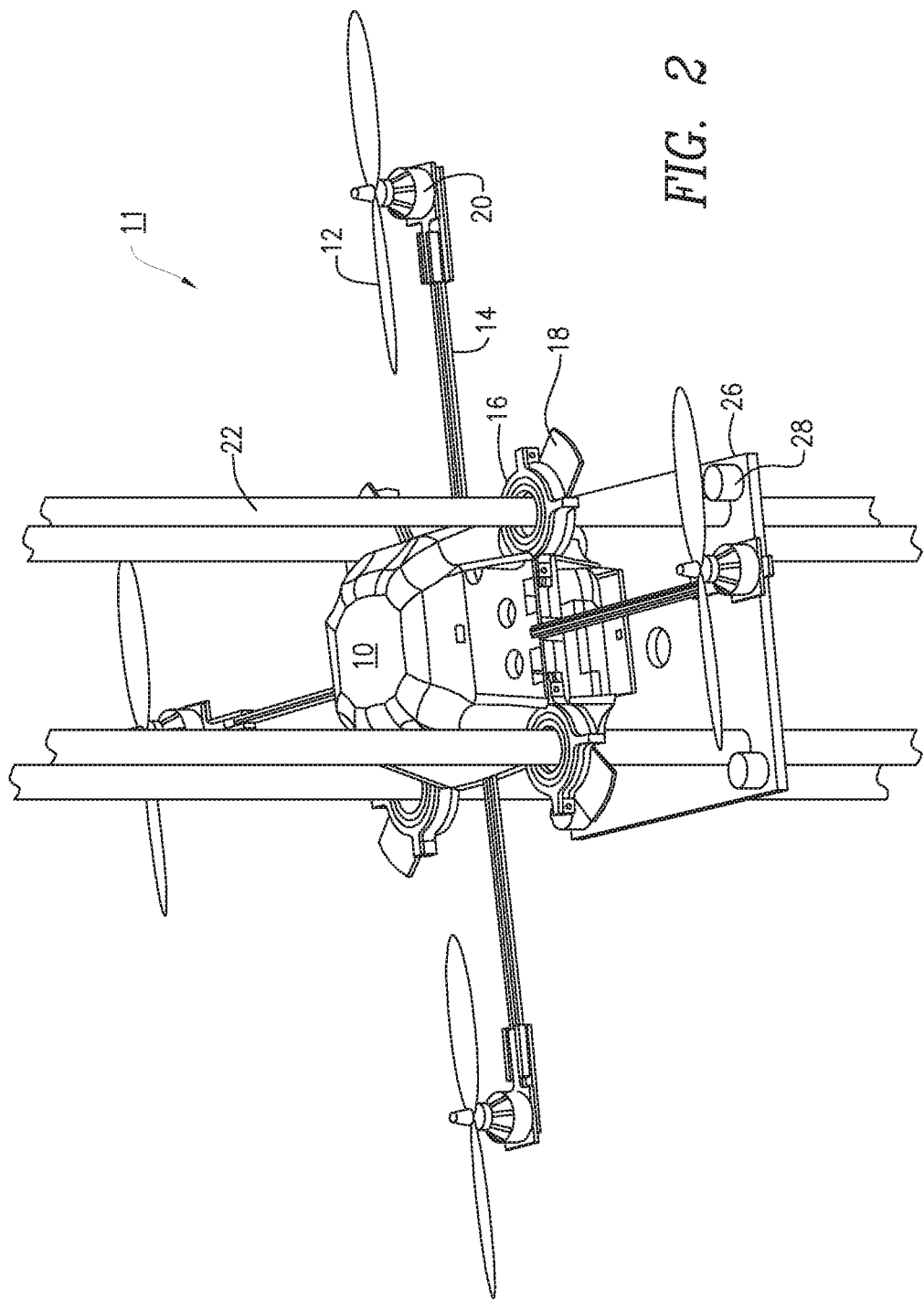
FIG. 2 is an illustration of one embodiment of a UAV captured by a stand.

FIG. 2 shows a view of the UAV 10 descending or ascending on the stand 11. Note that in some embodiments, more than one UAV may be stacked on the stand 11. Thus, more than one UAV may land on the same stand and be launched from the same stand in some embodiments. Navigation to the stand may be accomplished using GPS and.or drone drive electronics, as discussed below. In some embodiments, a GPS signal indicating UAV position may be assisted using Real Time Kinematic (RTK) processing to enhance the accuracy at which the UAV 10 approaches and descends upon the stand 11.

As the UAV 10 descends on the stand 11 and approaches a receiving plate 26, there may be a reflector 18 aligned vertically above a sensor/source 28, such as a light emitting diode, laser source, RF source, and corresponding sensor. The reflector reflects energy from the source to back to the sensor. In this way a height above the receiving plate 26 can be monitored as the UAV 10 ascends and descends on the stand 11. Further, software may be provided to cause alignment of the reflectors 18 with their corresponding sources/sensors 28, causing the shafts 22 to rotate to achieve alignment with the collars 16 of the UAV 10. In some embodiments, the receiving plate 26 has slots (not shown) that enable the shafts 22 to move radially or laterally to adapt the stand 11 to different sized UAVs.

To facilitate ascending and descending of the UAV 10 on the stand 11, a rail 14 may have mounted thereon an accelerometer. An accelerometer may be placed at each distal end of each of rails 14. An upper end 24 of a stand shaft 22 may have mounted thereon an accelerometer. An accelerometer may be placed on each shaft 22 to sense impact of the collars 16 and the shafts 22.

Figure 3:
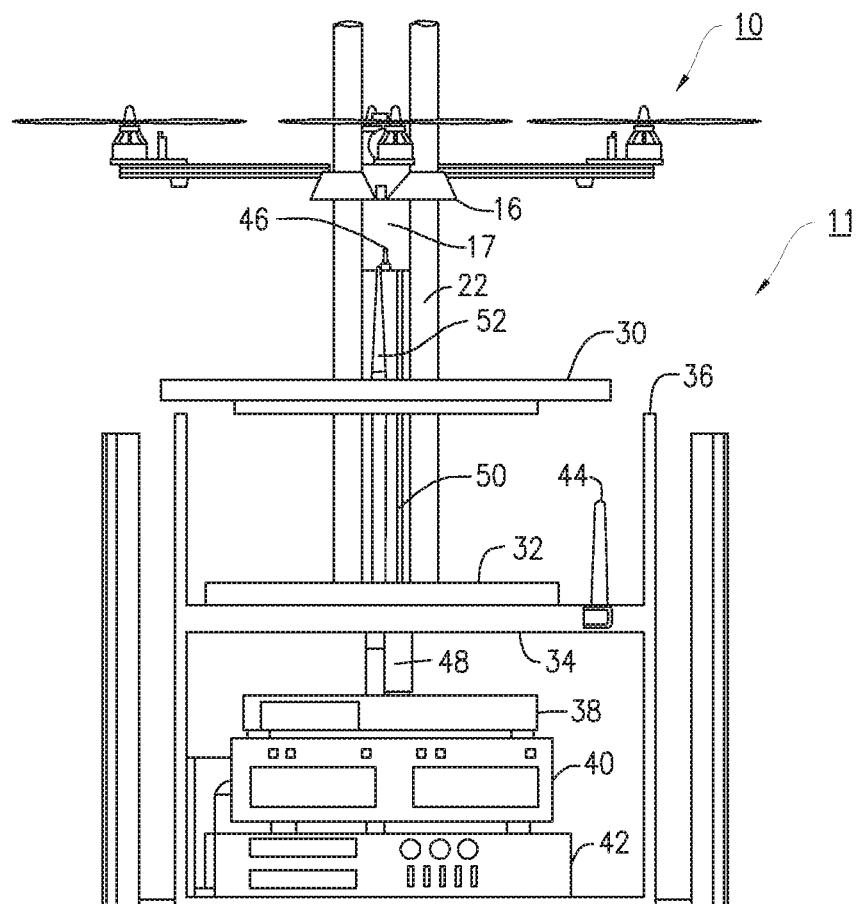
FIG. 3 is a side view of a stand.

FIG. 3 is a more complete view of one embodiment of the stand 11 with shafts 22 for receiving collars 16 of the UAV 10. In this embodiment, the stand 11 has an upper base plate 30 and a lower base plate 32 to which the shafts are moveably affixed, as explained below. The two base plates 30 and 32 provide strength and support for the shafts 22. The upper base plate 30 may serve as a receiving plate similar to the receiving plate 26, having optical or RF sources/sensors 28. The lower base plate 32 may be situated above a shelf 34 of a stand supporting structure 36. In some embodiments, a single plate, or plurality of plates greater than two, may be utilized to capture or support the shafts 22. The stand supporting structure 36 may provide space for electronics that include control electronics 38, power supplies and power charger 40 and RF communications 42, as well as networked computing systems, a server, a GPS base station, RF or optical identifiers, material handlers, and/or other related stand mechanical and electronic subsystems.

An antenna 44 may be mounted on the supporting structure 36 to enable radio frequency (RF) communication between the stand 11 and the UAV 10 via of an antenna 46 on the UAV 10. The antenna 44 may be one of several antennas provided at the stand 11 or nearby the stand 11. One or more of the antennas 44 may be directional or omni-directional. An antenna 44 may be mounted near the stand above the height of the shafts, for example. In some embodiments, a first antenna may be provided to enable communication of data between the stand 11 and the UAV 10, and a second antenna may be a global positioning system (GPS) receiver antenna. Yet a third antenna may facilitate communications with a radio base station, server or another stand, as explained below. For example, the stand 11 may send its position to the UAV 10. The UAV 10 may store the positions of one or more stands 11.

In some embodiments, an electric motor 48 drives a shaft 50 which extends through an aperture of the upper and lower base plates 30 and 32 and in the shelf 34, to reach the UAV 10, to start a generator or motor of the UAV 10. A nozzle 52 may extend from a fluid tank (shown in FIG. 4) to a fluid tank within a housing 17 of the UAV 10, via the apertures in the base plates 30 and 32 and in the shelf 34 to refuel the UAV 10 or to load or unload liquids or gases to or from the UAV 10. Note that conductors may extend through the apertures of the base plates 30 and 32 and shelf 34 to provide electrical communication of data between the stand 11 and the UAV 10. Conductors may also extend through the apertures to communicate electrical power from the stand 11 to the UAV 10.

Figure 4:
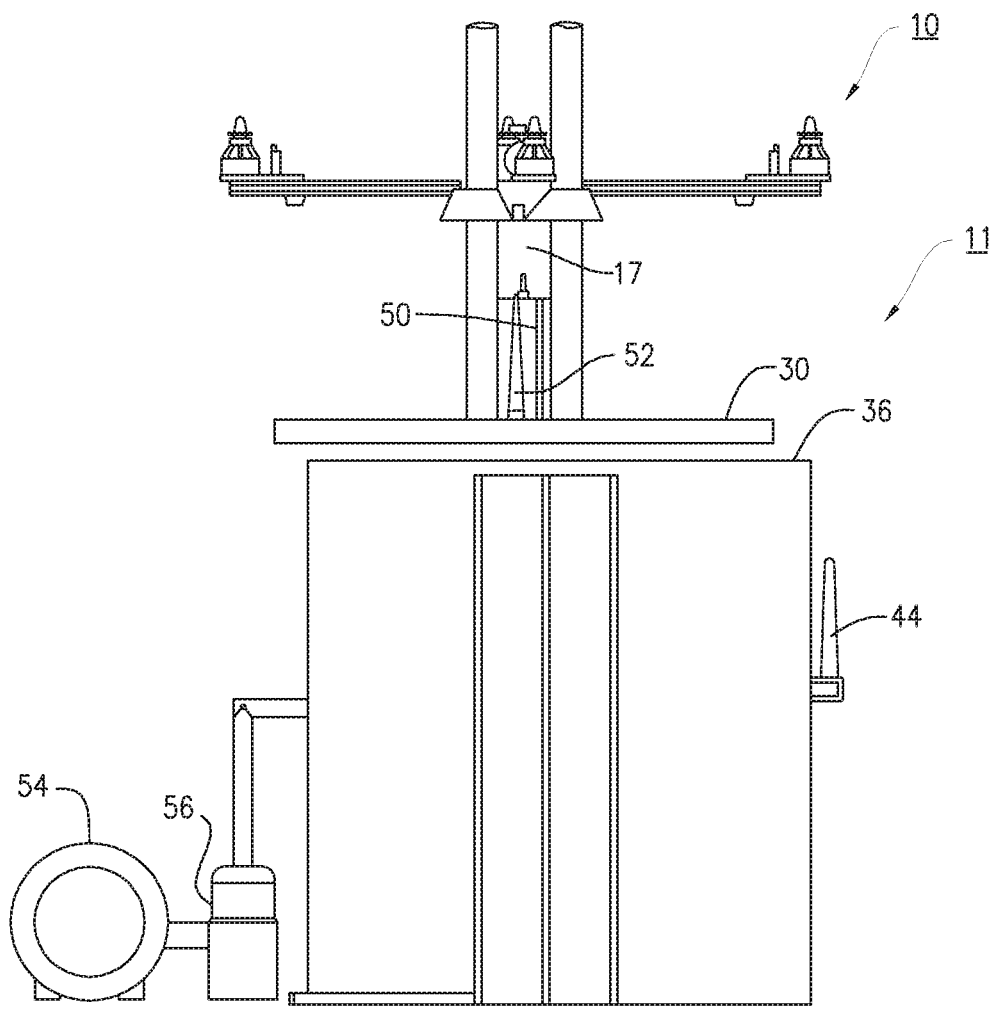
FIG. 4 is another side view of a stand.

The fluid tank could also be included with the stand 11 to include and transfer fluid other than fuel. Such fluid could be coupled to a fluid tank within the housing 17 of the UAV 10. FIG. 4 is a side view of the stand 11 which shows a fluid tank 54 which may contain fuel, coupled via of a pump 56 to the nozzle 52. In some embodiments, fluid gauges may be provided on the stand 11 and/or the UAV 10 to provide a visual indication of a level of fluid in a tank of the stand 11 or the UAV 10. In some embodiments, fluid monitors may be place in line with a fluid line that couples fluid from a fluid tank of the UAV 10 and a fluid tank of the stand 11, to indicate a rate of fluid flow there between. A conveyor belt, chute or other material handling system may be located near the stand 11 or integrated with the stand 11 to facilitate handling a payload carried by the UAV 10.

Figure 5:
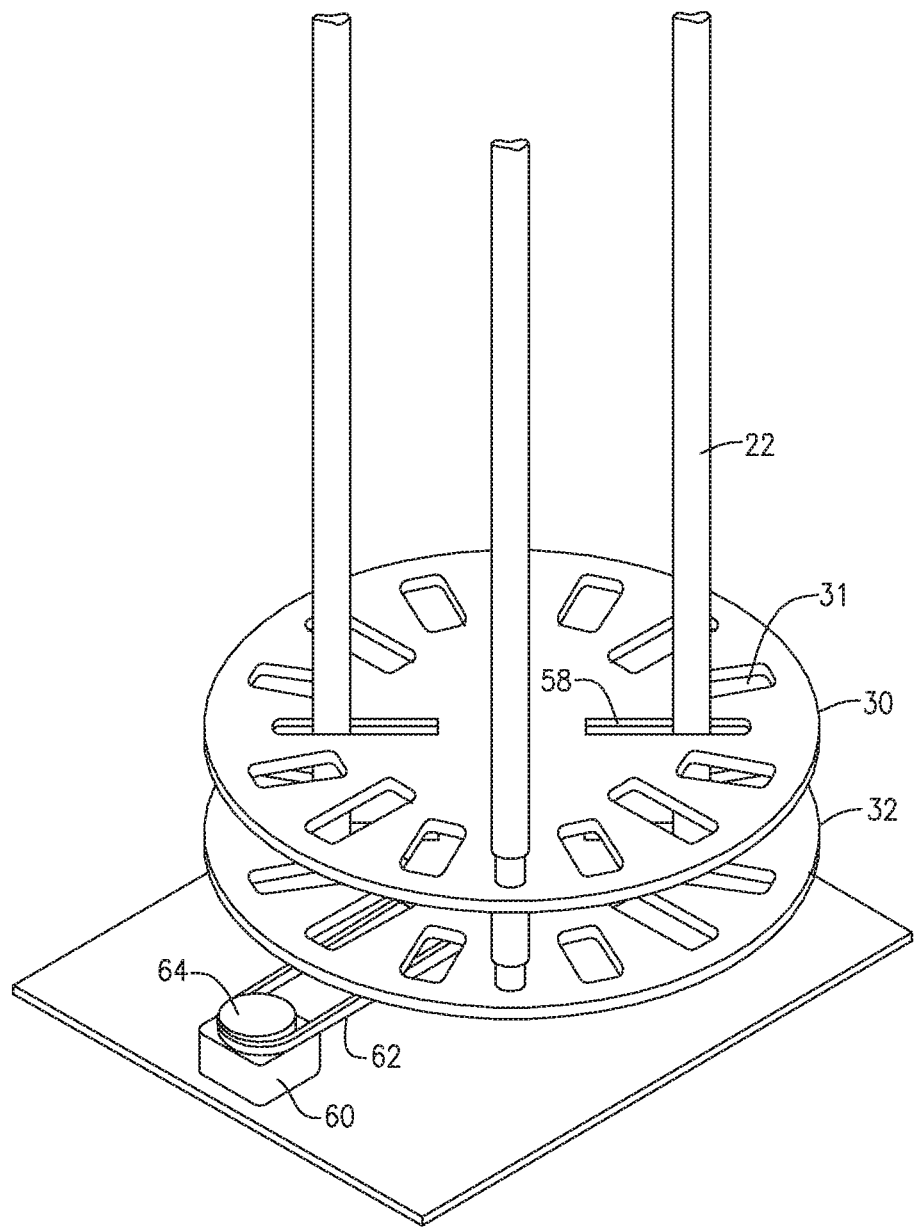
FIG. 5 is an illustration of base plates of a stand.

FIG. 5 is a perspective view of one embodiment of a portion of the stand including the base plates 30 and 32 along with shafts 22. Apertures 31 may be included around the periphery of the base plates 30 and 32 to reduce weight while maintaining strength. The position of the shafts 22 with respect to the base plates 30 and 32 may be adjusted radially via slots 58 to accommodate UAVs of different sizes. In some embodiments, X-Y adjustment of the shafts 2 may also be provided. In some embodiments, the radial, angular and/or x-y position of the shafts may be adjusted in response to control signals generated to achieve alignment with a landing UAV 10.

Figure 6:
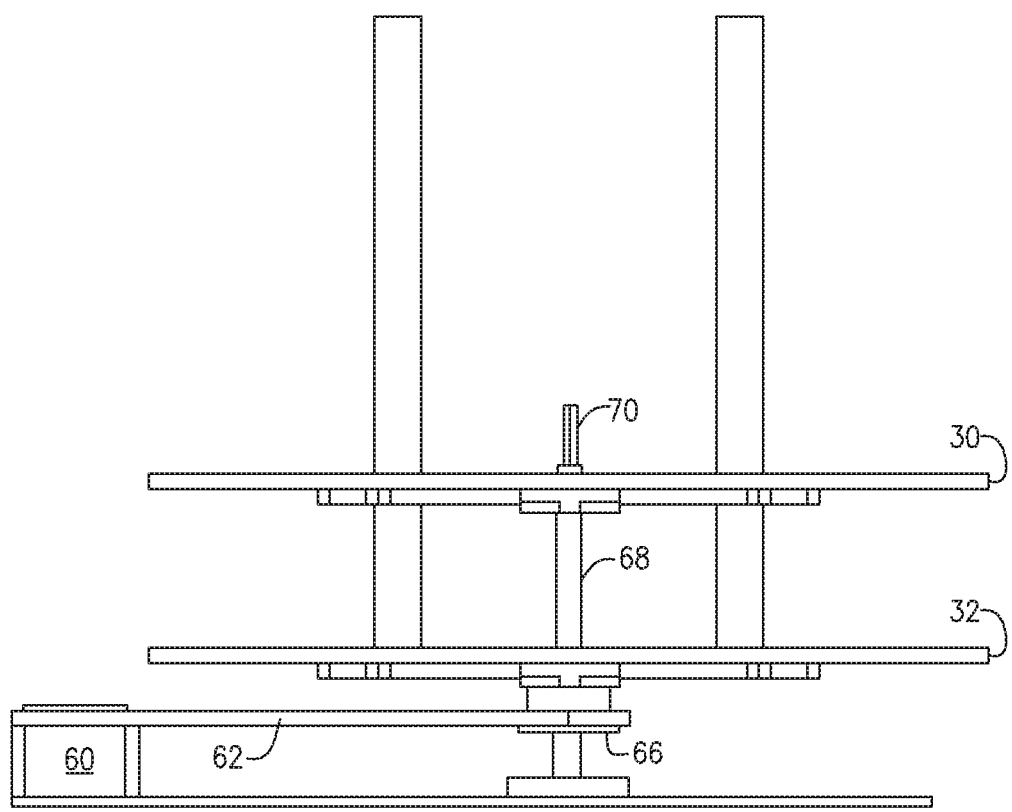
FIG. 6 is side view of base plates of a stand.

In some embodiments, a motor 60 may be provided to rotate the base plates 30 and 32 via a belt 62 and pulley 64. In other embodiments, a direct drive linkage between the motor and plate(s) may exist. Such direct drive linkage may cause an x-y translation of shafts 22 as well as radial motion of the shafts 22. FIG. 6 is a side view of the assembly of FIG. 5 showing the belt 62 coupled to a pulley 66 connected to the base plate 32 so that rotation of the motor 60 causes the base plates 30 and 32 to rotate about a vertical axis passing through the center of the base plates 30 and 32. The shafts 22 move with the base plates 30 and 32 to position the shafts to match a yaw orientation of the UAV 10. FIG. 6 also shows a shaft 68 that couples the base plates 30 and 32. The shaft 68 may be hollow and have conductors inside that are coupled to conductors 70 via slip rings to provide continuity of electrical conduction between the stand 11 and the UAV 10.

Figure 7:
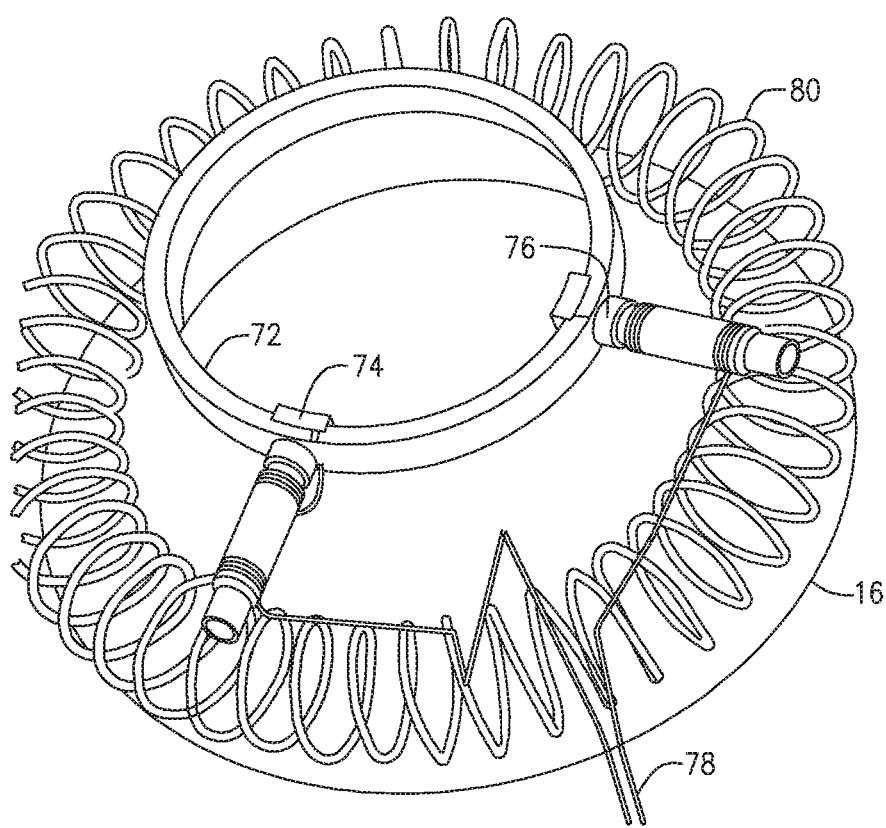
FIG. 7 is one embodiment of a fitting of a UAV.

FIG. 7 is a more detailed illustration of a collar 16 to be received by a shaft 22 of a stand 11 that is used for launching, landing, testing, refueling and recharging, and loading and unloading the UAV 10. The collar 16 has a sleeve 72 that is slightly larger in diameter than the diameter of a shaft 22 of the stand so that the shaft 22 of the stand can fit through the sleeve 72. On the inside of the sleeve 72 is a conductor 74 that can make contact with a conductor incorporated into or on the shaft 22 of the stand. In one embodiment, the collar 16 is connected to the UAV rail 14 by a spring 76.

The conductor 74 may be wired to the battery charging system of the UAV 10. The battery cell voltage levels may be monitored by electronics within a drone drive device (explained below) or within the UAV 10 and transmitted to the stand. The stand may simulate these cell voltage levels to a battery charger subsystem during the battery charging process. Thus, in some embodiments, the UAV 10 monitors a charge of its batteries and notifies the stand 11 when the batteries are fully charged.

Note that the shafts 22 may be hollow to contain conducting wires therein that communicate power and/or signals between the stand 11 and the UAV 10. Note also that the collar may include bearings embedded in the sleeve 72 to facilitate the movement of the UAV 10 on the shafts 22 as the UAV 10 descends or ascends on the stand 11. Note further, that an indicator may be mounted on the collar 16 to indicate when the UAV battery is being charged.

Thus, a conductor on a shaft 22 of the stand 11 may be connected to an electrical power source. When the conductor 74 at the sleeve 72 makes electrical contact with a conductor on or within the shaft 22, power from the electrical power source at the stand 11 is conducted to a battery of the UAV 10 through the conductor 74 via wires 78. Also shown in FIG. 7 is a coil 80 which serves as an electromagnet that can be energized to attract the sleeve 72 to the shaft 22 of the stand. To this end, the shaft 22 of the stand may be magnetic or have a magnet disposed thereon or therein.

Along the extent of the shafts 22 may be a series of alternating permanent or electromagnets that, when energized, form a magnetic circuit that can be used to propel the UAV 10 in an upward direction during UAV launch and/or that can be used to provide an active brake to reduce velocity in which a UAV lands and mates between the stand couplers and UAV sleeves during landing.

The conductor 74 on the sleeve 72 may be attached to a spring 76 and may be in communication with a battery of the UAV such as via the UAV rail 14. A wire 78 connected to the conductor 74 provides electricity to charge the battery of the UAV 10. In some embodiments, the spring 76 itself may serve as a conductor to facilitate a charge of the battery of the UAV 10, so that the wire 78 may be omitted. In some embodiments, an indicator such as a light emitting diode (LED) or lamp may be positioned at or near the sleeve 72 to indicate when the UAV battery is being charged.

Figure 32:
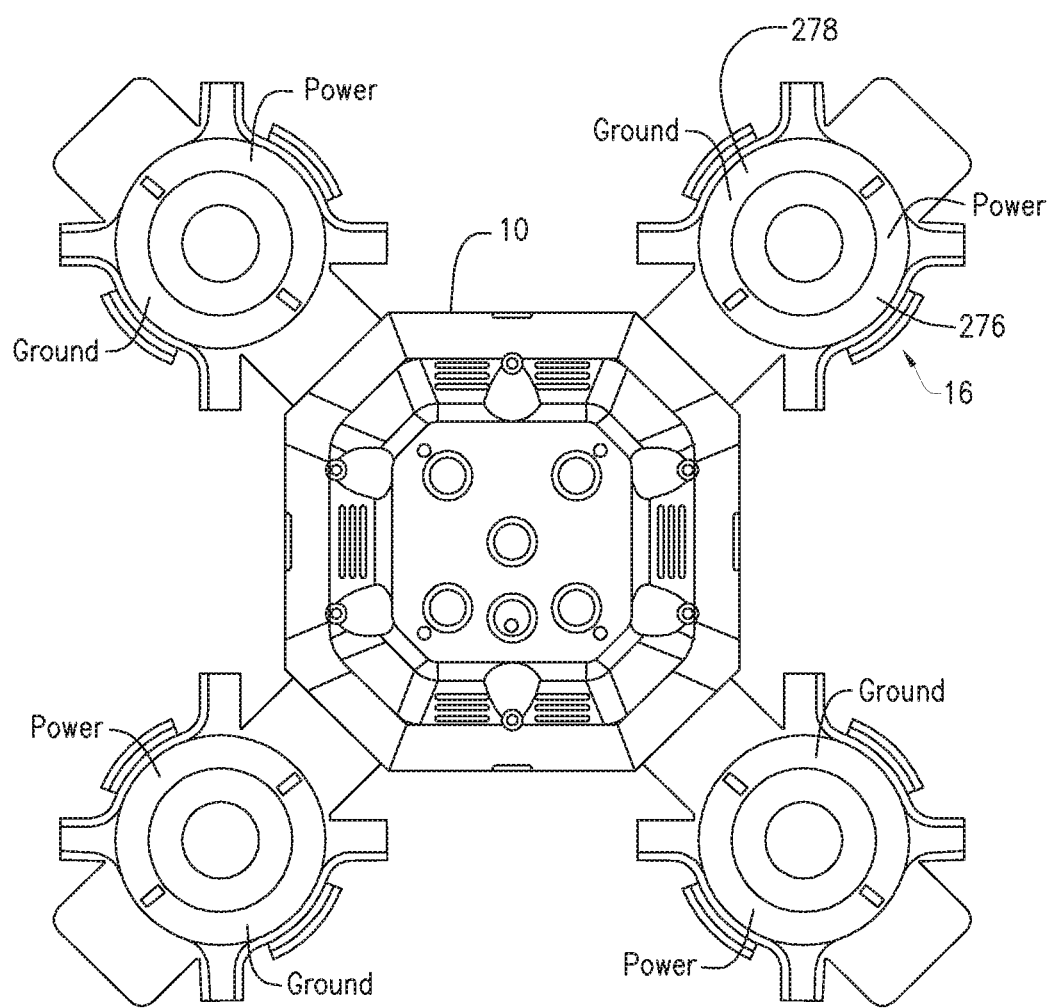
FIG. 32 is a first configuration of collars for conducting power to a UAV.
Figure 33:
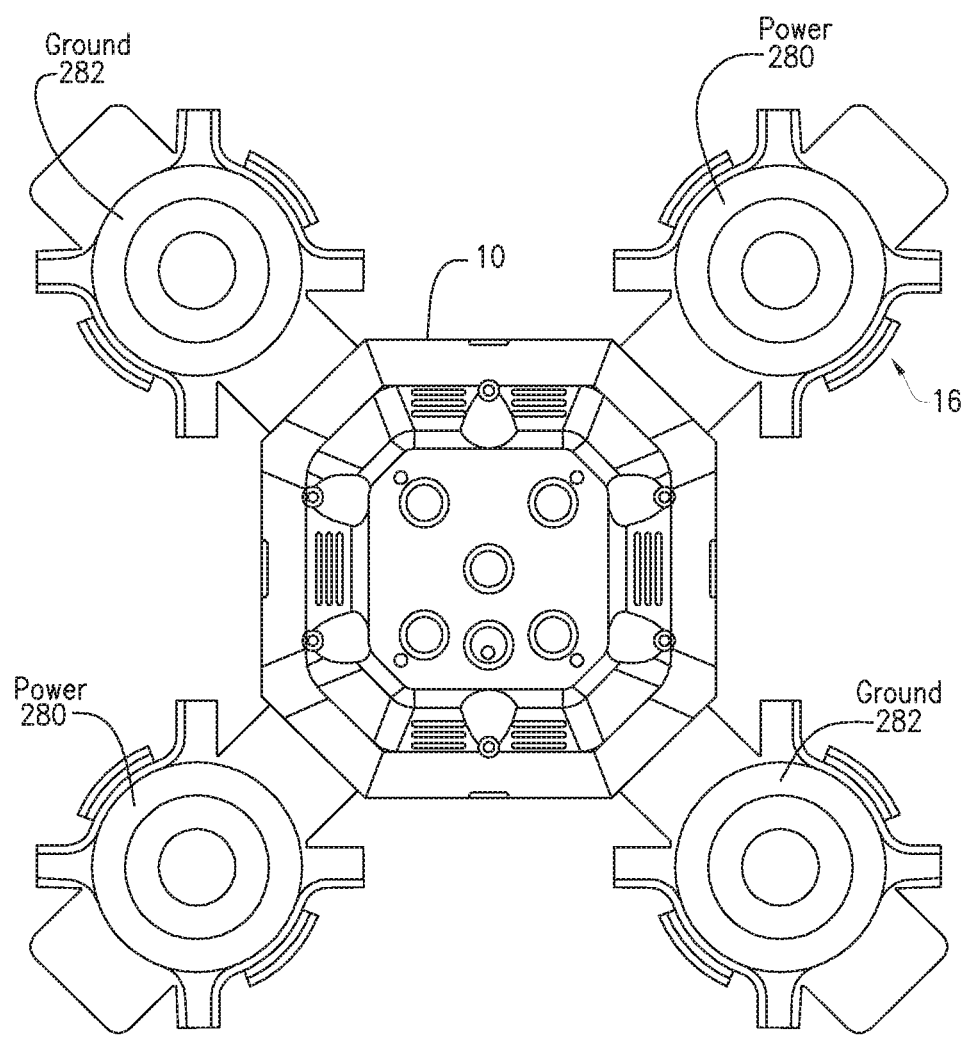
FIG. 33 is a second configuration of collars for conducting power to a UAV.
Figure 34:
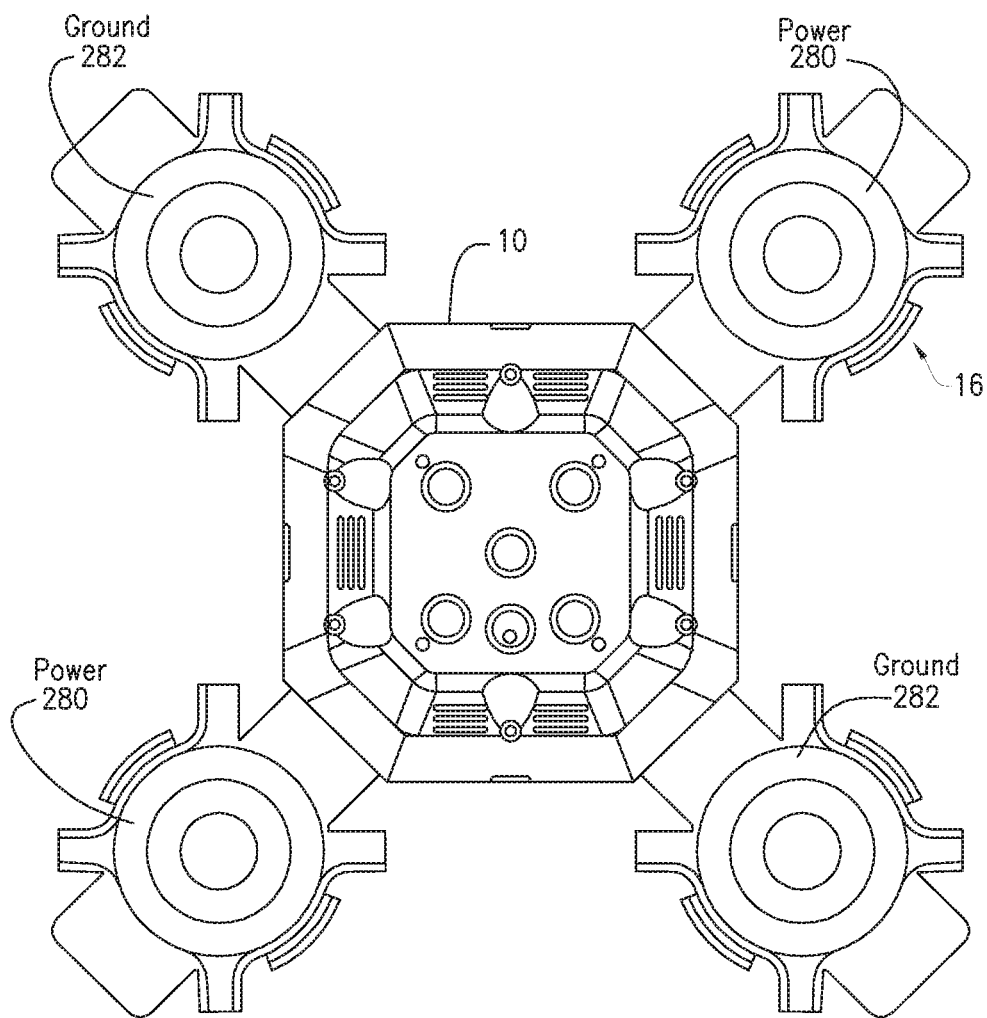
FIG. 34 is a third configuration of collars for conducting power to a UAV.

In some embodiments, one or more of the collars 16 may have a ring to which electrical power and/or electrical ground can be connected. For example, FIG. 32 shows a UAV with split ring collars 16. One half ring 276 is connected to electrical power, whereas the other half ring 278 is connected to electrical ground. FIG. 33 shows a UAV 10 with a first pair of collars 16 assigned to be connected to power 282 and with a second pair of collars 16 assigned to be connected to ground 282. FIG. 34 shows a UAV 10 with a first pair of adjacent collars 16 connected to power 280 and a second pair of adjacent collars 16 connected to ground 282. In some embodiments, the charging system will determine the polarity of the collars 16 prior to energizing the charging system and will adapt the signal power and ground to ensure the proper connections. Prior to charging, continuity and faults are also checked.

Note that in some embodiments the electrical connection to charge the UAV battery can be made through the base plate 30 of the stand 11. In these embodiments, the base plate 30, or a portion of the base plate 30, may be conducting or provide a receptacle and may mate with a conducting portion or plug of the UAV 10 to provide conduction of electricity to the UAV battery when the UAV 10 comes to rest on the base plate 30, in a manner analogous to a cordless phone mating to a cordless phone charging cradle. In some embodiments, the stand shafts 22 of the stand 11 have conductors that mate with the sleeves 72 of the collars 16. Thus, in some embodiments, the shafts 22 extend from a base plate 30 and each shaft 22 may receive one of the collars 16.

The upper end 24 of each shaft 22 may be tapered as shown in FIG. 1. Additionally, each shaft 22 may have a magnet at the upper end 24 of the shaft 22 to attract the UAV 10 during a landing operation. A magnet at the upper end 24 of the shaft 22 may be an electromagnet, a natural magnet or combination of natural and electromagnets. In some embodiments, one or more of the shafts 22 has a conductor along a side of, or within, the shaft 22 to make contact with the conductor 74 at the sleeve 72 of the collar 16. The conductor along a side of, or within, a shaft 22 is connected to a power source which may be a DC power source disposed beneath the base plate 30. In some embodiments, power may be coupled to the UAV from the stand 11 wirelessly. In some embodiments, the charge connectors which connect the UAV electrical system to the stand electrical system may incorporate spring, rubber or other shock absorbing materials that absorb or reduce mechanical stress when a UAV lands on the stand and in addition may provide an upward force to ensure conductor contact for the charge couplers.

Figure 35:
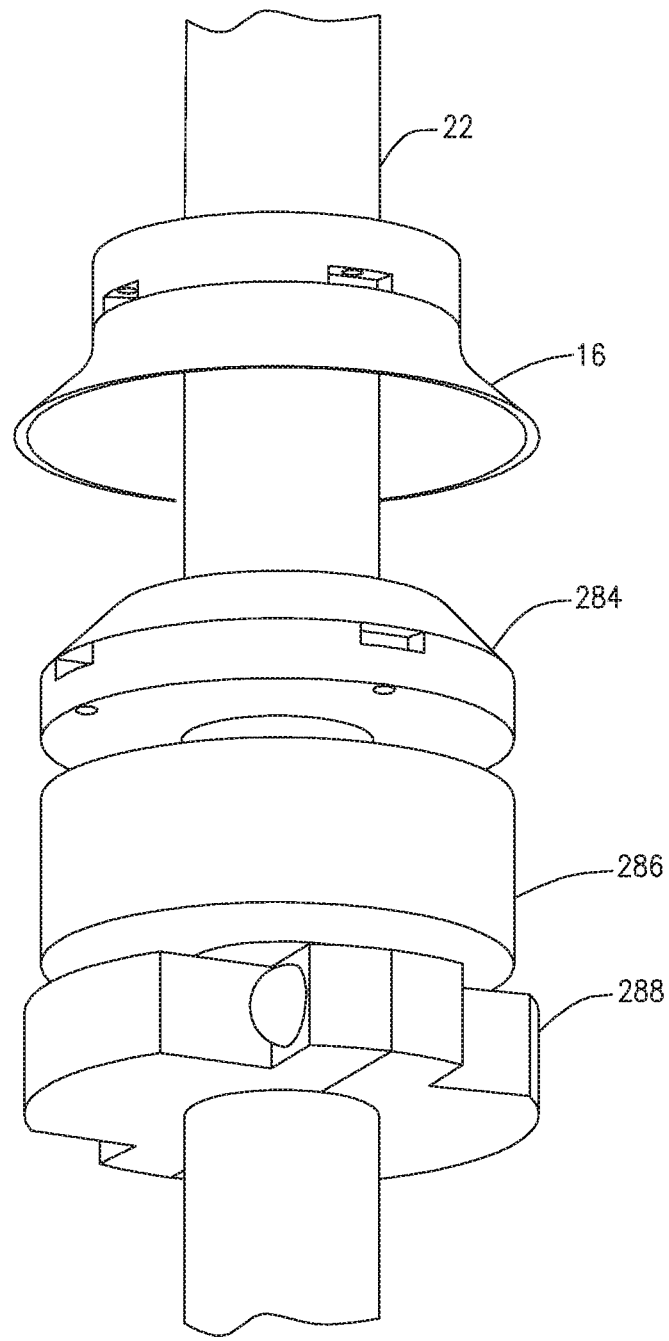
FIG. 35 is a configuration of a rubber dampening mechanism to dampen impact of a landing UAV.
Figure 36:
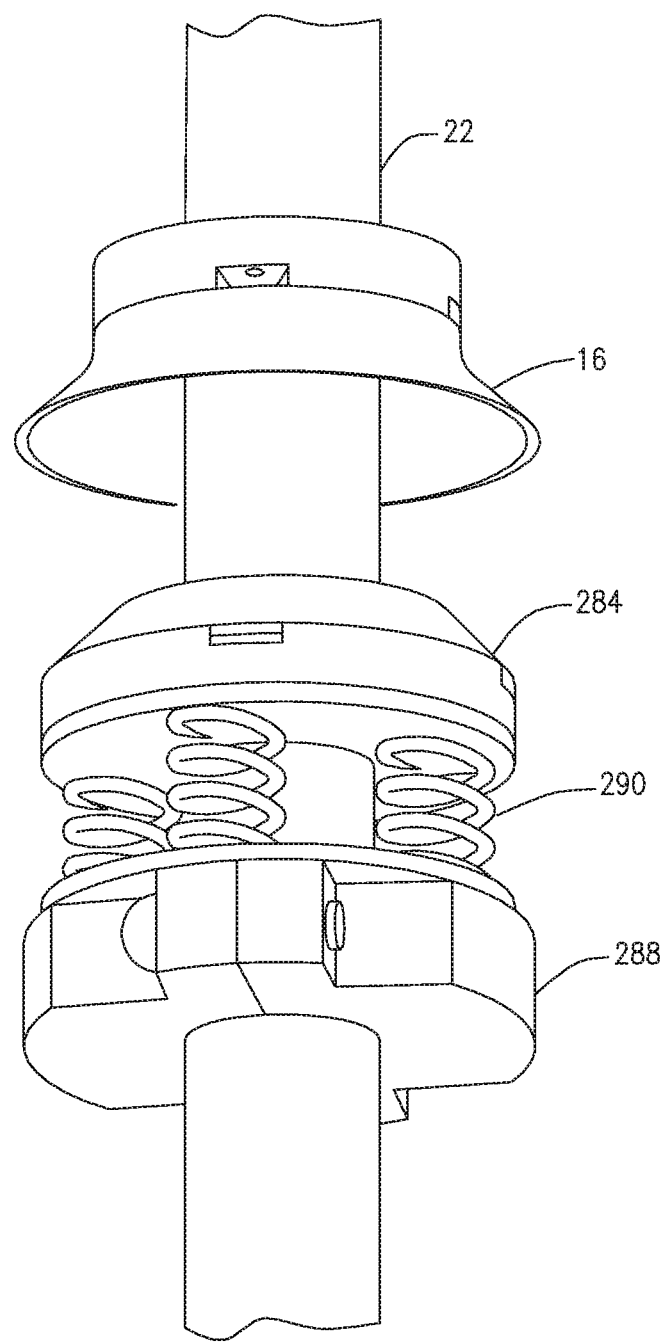
FIG. 36 is a configuration of a spring dampening mechanism to dampen impact of a landing UAV.

Thus, in some embodiments, the UAV 10 is adapted to be received by the stand 11. The UAV 10 may comprise a plurality of fittings or collars 16 adapted to be received by shafts 22 of the stand 11 so that the UAV 10 can be captured by the stand. A fitting of the UAV 10 may include a collar 16 adapted to slide over a shaft 22 of the stand 11. The collar 16 may be surrounded at least in part by an electromagnet, which may include a coil 80. As shown in FIG. 35, in some embodiments, a collar 16 of the UAV 10 slides down the shaft 22 until it contacts a first receiving collar 284 that is backed by a rubber collar 286 that rests against a stop collar 288. The rubber collar 284 acts to absorb impact of the collar 16 when the UAV 10 lands. As shown in FIG. 36, in some embodiments, the receiving collar 284 is separated from the stop collar 288 by springs 290 that absorb impact of the collar 16 when the UAV 10 lands.

Thus, the stand 11 has shafts 22 extending from base plates 30 and 32, which are supported by a supporting structure 36. Between the shafts 22, extending up through the center of the base plate 30 and 32 and through an aperture in the shelf 34, is the fluid nozzle 52 that is connected to a fluid tank 54. The fluid tank 54 may have a fluid pump 56 that pumps fluid to the fluid nozzle 52. The fluid nozzle 52 mates with an orifice of the UAV 10 that couples fluid into a fluid tank (not shown) of the UAV 10. In some embodiments, the fluid tank 54 is separable from the stand 11 for storage and/or safety. In some embodiments, the fluid tank 54 is elevated above a resting position of the UAV on the stand so that a fluid can be discharged into the UAV 10 without a fluid pump. Note that in some embodiments, more or fewer shafts 22 than four may be included in the stand 11.

The rotation of the base plates 30 and 32 allows the orientation of the shafts 22 to match a rotational orientation of the UAV 10 as the UAV 10 is approaching to land on the stand 11, to facilitate capture of the UAV 10 by the stand 11. Shafts 22 may also be translated in an x-y plane to facilitate capture. Thus, during landing, the collars 16 of the UAV 10 slide over the shafts 22 so that motion of the UAV 10 is at least somewhat constrained by the shafts 22, for instance allowing the UAV 10 to move up and down and, to some extent, pitch and roll, without being able to fly away unless directed upward and off the top of the shafts 22.

In some embodiments, a clamp may be disposed on at least one shaft 22 to prevent the UAV 10 from flying up and off the stand. In some embodiments, small holes in the base plates 30 and/or 32 may be used to pass light from an optical or infra-red light source that may be used to determine height and/or UAV alignment to the stand 11. In some embodiments, an optical or RF source and sensor may be mounted directly on the base plate 30 to measure the height of the UAV as it ascends or descends on the stand. In some embodiments, a camera may be mounted on the stand to allow remote observance of the landing and launching of the UAV 10. In some embodiments, the altitude of the UAV 10 relative to the stand may be communicated via RF transmission from the UAV 10 to a control system of the stand 11 to assist in UAV landing or launch.

In some embodiment, in the center of the base plates 30 and 32 and the shelf 34 are aligned apertures to enable the fluid nozzle 52 to protrude to couple to the UAV 10 to provide fluid to the UAV 10. In some embodiments, the fluid nozzle and the apertures through which it passes are offset from center. The position of the fluid nozzle 52 may be dependent upon the position on the UAV of the orifice that receives the fluid. In some embodiments, the fluid nozzle 52 is retractably projectable into the fluid-receiving orifice of the UAV 10. An aperture in the base plates 30 and 32 and the shelf 34 may also allow passage of the shaft 50 to provide propulsion from a motor 48 to a starter motor, other motor, or engine of the UAV 10. The motor or engine may be enclosed in a housing of the UAV 10 which may also include a fluid tank and/or a fuel tank, and/or electronics.

In one embodiment, one or more two dimensional geometric markings or three dimensional geometric shapes inscribed or installed on the base plate 30 or the receiving plate 26 may be used to provide an image, optical or RF target for alignment of the UAV 10 when it is being maneuvered to be captured by the stand 11. The target or inscribed pattern may be as simple as a set of crosshairs, or could be complex. The inscribed pattern in addition may also encode an identity of the stand 11, and/or a location or address of the stand 11, services provided by the stand, and/or an identity of a person or business entity associated with the stand 11. The target may be detected and decoded with the aid of a video camera on the UAV 10, or by laser bar code readers, or infra-red sensors, or RF identification readers or other sensor, detection and decoding. Thus, upon approach of a UAV 10 to a stand 11, the UAV may interrogate an encoded target to verify an identity of the stand 11 and possibly also, services provided by the stand 11.

Thus, in some embodiments, vertical shafts 22 project upward from the base plates 30 and 32. Each shaft 22 may be capped with a magnet. At least one shaft 22 may have a conductor as described above for conducting power to the UAV 10 when captured by the stand 11. The fluid nozzle 52 projects through the aperture in the base plates 30 and 32. In some embodiments, a collar positioned on each shaft functions to provide support for the UAV 10 when the UAV is landed. Each collar of the shafts 22 may support a corresponding sleeve 72 of the UAV 10. In addition to, or in the alternative to, a fluid nozzle, the stand 11 is equipped to include or integrate with package or material handling equipment that transfers a package or material to and from the UAV 10.

Figure 8:
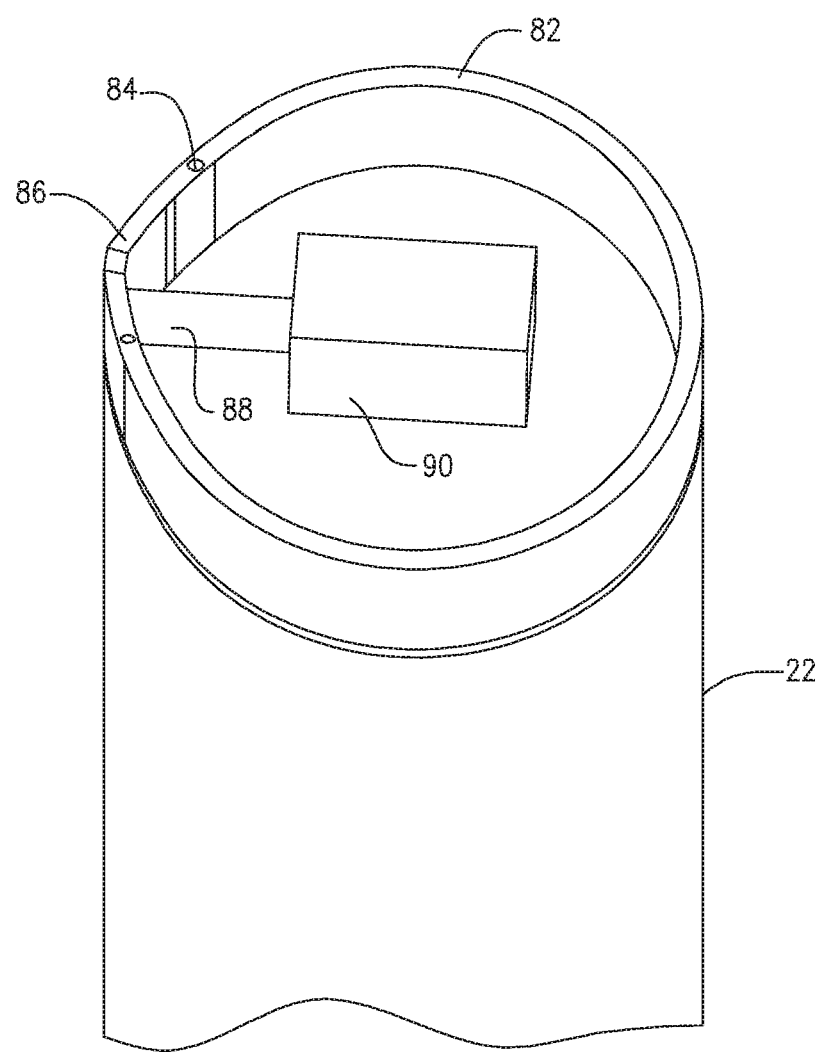
FIG. 8 is one embodiment of a vertical lift clamp.

FIG. 8 is a view of a clamping mechanism 82 integrated with a shaft 22 that prevents the UAV 10 from ascending from the shafts 22 when the clamping mechanism 82 is open. The clamping mechanism 82 includes a hinge 84 and a gate 86 that is positioned by a shaft 88 driven by a motor 90. The motor 90 may be controlled by the control electronics of the stand 11. When the gate 88 is in the open position, the gate interferes with the sleeve 72 of the collar 16, preventing the collar from moving upward on the shaft 22. Thus, some embodiments of the stand 11 include an ascension inhibitor that inhibits or prevents ascension of the UAV 10 from the stand 11.

Figure 9:
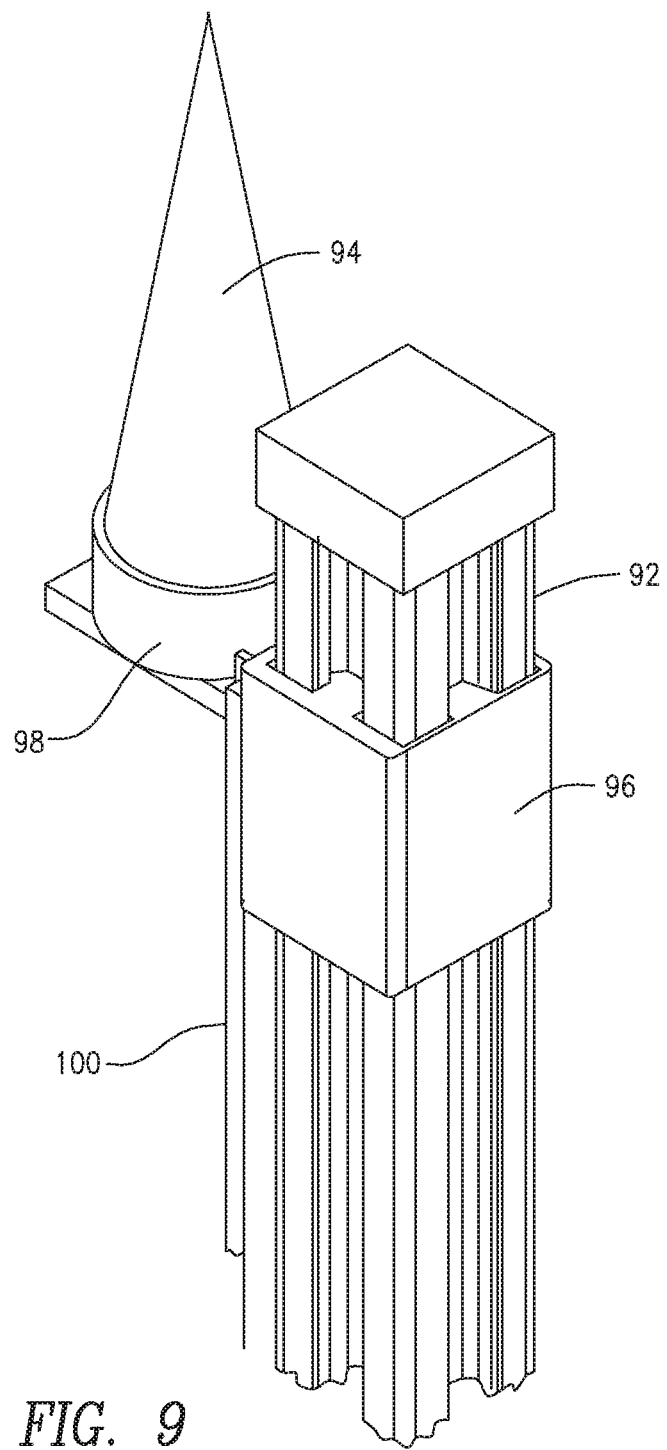
FIG. 9 is an alternative embodiment of a shaft of a stand.

FIG. 9 illustrates an alternative embodiment of a shaft 22. The shaft 22 of FIG. 9 has grooves that mate with a sliding collar 96 that moves up and down on the shaft 22. Attached to the collar 96 is a ring 98 which holds a cone or shaped part 94 for receiving the collar 16 of the UAV 10. A conductor 100 may be provided to conduct electricity to the ring 98 and thereby to the UAV 10 via the collar 16.

The stand 11 may be employed to conduct tests on the UAV 10 to ensure that its motors control electronics, motor drivers, generators or other major subsystems are performing to operation specifications prior to launch. Thus, the stand 11 may be equipped with control electronics to perform pre-flight testing of the UAV 10. For example, tests may be run prior to launch to calibrate and adjust the motor controls of the UAV 10 to adjust trim positions (bias settings) for pitch, roll and yaw.

Tests can also be run on the UAV 10 while captured on the stand that verify UAV characteristics such as UAV type, payload type, payload, balance, center of mass, motor and propeller efficiency. In these tests, the stand 11 may ensure that a payload does not exceed the UAVs operational lift capacity. Tests can also be performed to verify that the payload of the UAV 10 does not adversely affect the center of mass and inertial loading on the UAV 10.

The stand 11 may include an altimeter to determine a height of the UAV 10 when above the stand or captured by the stand. A signal from the altimeter may be fed to control electronics to control the flight of the UAV 10 either above the stand or while captured by the stand. In some embodiments, the stand has at least one sensor to detect a source of energy that is one of reflected and transmitted from the UAV 10. At least one sensor may produce a signal indicative of alignment of the UAV 10 with the shafts 22 of the stand. The sensor may be an infrared sensor, for example. In some embodiments, a first sensor of the stand 11 senses a height of the UAV 10 as it approaches the stand and a second sensor of the stand 11 sense a height of the UAV 10 as it slides down the shafts 22. The first and second sensors may be optical, video and/or radio frequency (RF) sensors.

In some embodiments, the stand 11 may be adapted to incorporate material holders and handlers enabling the UAV 10 to load or unload material payload. Thus, the stand may incorporate linkages to other material handling systems such as conveyor belts, chutes, vacuum pumps, and pressurized pumps connected to tanks and collection bins. The stand 11 may communicate with payload material handling systems mounted on the UAV 10 to coordinate the transfer of materials from the UAV 10 to the stand's material handling systems. The material handling system may use mechanical, compression, pressure, and flow or other means to transfer materials between the stand and the UAV 10. The shafts 22 of a stand 11 may be adjusted to adapt to a size of a package carried or to be carried by the UAV 10.

In some embodiments, the UAV collars or fittings 16 that are captured by the stand 11 may be other than cylindrical and may match the shape of shafts 22 of the stand that are not circular in cross-section. The collars or fittings 16 may attach to the UAV 10 via stiff but flexible mechanical couplings such as spring or elastic material. The collars or fittings 16 may be used to shield electrical wires conducting electricity between the stand and the UAV 10. The collars or fittings 16 may incorporate strain gauges and other similar sensors to automatically detect and measure force to determine degrees of pitch, roll and yaw.

The shafts 22, or an upper portion of the shafts 22, may be made of a flexible material such as rubber, to absorb impact when the UAV 10 strikes the shafts. Note that the shafts 22 may be tapered at the tops 24 and/or may be tapered along the length of the shafts 22. Note also that the shafts 22 may be made of a composite material or carbon fiber to achieve maximal stiffness at the upper ends of the shafts 22. Note also that the shafts 22 may be magnetized or include magnets to attract the collars 17 to facilitate landing.

Figure 10:
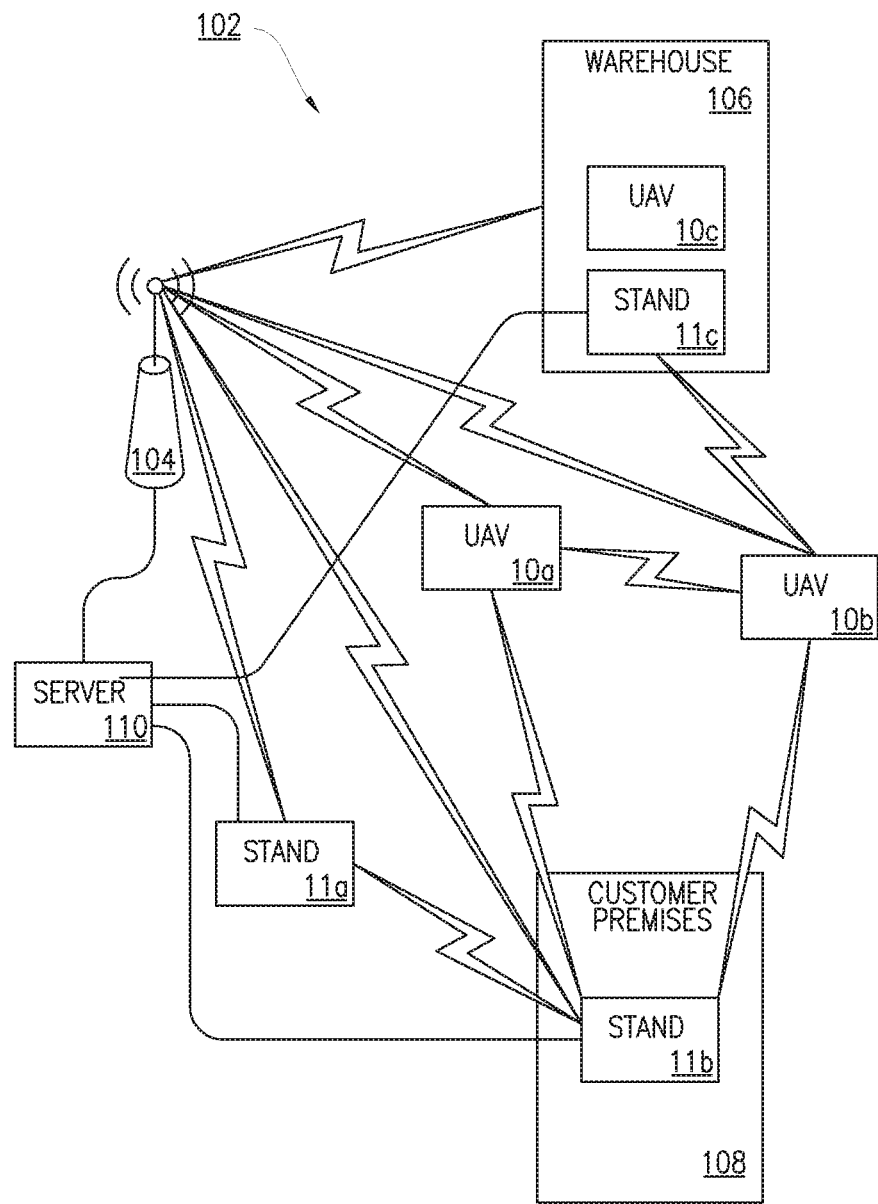
FIG. 10 is a block diagram of a network of stands.

FIG. 10 is a system including a networked fleet of UAVs, 10*a*, 10*b* and 10*c*, referred to collectively herein as UAVs 10, and a network of stands 11*a*, 11*b* and 11*c*, referred to collectively herein as stands 11. In some embodiments, one or more stands 11 are in radio communication with one or more UAVs 10. Some stands may be in radio or wired communication with other stands, and some UAVs may be in radio communication with other UAVs. Further, one or more radio base stations 104 may be in radio communication or wired communication with one or more stands and/or one or more UAVs.

The radio communications between multiple stands acting as Continuously Operating Reference Stations (CORS) for the UAVs may be used to facilitate assisted Real Time Kinematic (RTK) calculations to improve the navigational position estimate of the UAVs included in the UAV networked fleet. As the number of stands with CORS capability increases, the accuracy of a UAV position determination increases, such that, for example, UAV position may be determined within a centimeter. The CORS-assisted position information can be used to improve the accuracy of the UAV position determination, even if the UAV 10 does not land or launch from a particular stand 11 implementing the CORS capability. Thus, during flight between stands 11, the UAV 10 may obtain its position occasionally or continually from nearby stands 11 having CORS capability.

A UAV site 106 such as a warehouse (as shown, for example, in FIG. 10), a factory, a grocery store, a business headquarters, a satellite office, a field office, or other location, may include one or more UAVs capable of carrying a payload of one or more items stored in the UAV site 106. The UAV site 106 may be in wired or radio communication with one or more radio base stations 104. A radio base station 104 may be a cellular telephone communications base station adapted to communicate with UAVs 10 and/or stands 11. Thus, the radio base station 104 may be connected to a backhaul network such as the public switched telephone network (PSTN) and/or the Internet. In some embodiments, the stands may be in wired communication with one or more servers 110, via of the Internet, for example. Also, the radio base station 104 may be coupled wirelessly or by wired connection to a server 110.

A stand 11 may be located at a customer premises 108, which may be a private residence or a business address, for example. A logically related system of stands 11 may be positioned along a route such as, for example a highway, road, oil or gas pipeline, power lines, railroad, waterway or may be located at locations of a business chain or type such as a chain of grocery stores, a chain of restaurants, warehouses, lumber yards, banks and other business chains or types. A logically related system of stands 11 may be monitored and/or controlled by a server 110. A server 110 may be located as a standalone system or may be collocated at a radio base station 104 or a stand 11, or may be located at a UAV site 106.

A logically related system of stands may include intermediate stands situated between an origin stand and a destination stand. The intermediate stands may extend the range of travel of a UAV by providing intermediate recharging and/or refueling stations. As discussed further below, a server 110 or radio base station 104 may function as a control center to control a plurality of stands and UAVs.

In some embodiments, the components of FIG. 10 may operate together to implement an automated or semi-automated delivery service. For example, a user at the customer premises 108 may order an item via the Internet or by telephone from a business that operates a warehouse or other UAV site 106. At a warehouse, for example, the ordered item is affixed to a UAV 10 that is positioned on a stand 11 as described herein. In some embodiments, a flight plan that includes a location of the customer premises 108 and a flight course to the location is uploaded to the UAV 10. Alternatively, or in addition, the flight plan may be sent from the warehouse to the radio base station 104 or to the server 110, or to a next hop stand or a destination stand. This information and/or updates to the flight plan may be sent from the radio base station 104 or server 110 or stand 11 to the UAV 10.

Alternatively, or in addition, the flight plan may be sent from the UAV 10 to the radio base station 104 or the server 110 or to a stand 11. The flight plan may include multiple segmented trips with intermediate landings and launches on stands to reach its end destination. The trip may be pre-planned prior to initial launch from the origin stand, but also may include dynamic routing while the UAV is in route based on stand utilization and availability, UAV endurance, e.g., fuel remaining, electrical charge remaining, and other factors that may affect the UAV routing between the origin and destination. In some embodiments, the flight plan may be sent from the server 110 or the radio base station 104 to the UAV 10 or the stand 11.

Stands at a UAV site 106, such as a warehouse, may be arranged in different geographic configurations according to, for example, the terrain, physical layout of the site, and may be configured to optimize managing multiple coordinated landings and launches. The stands may be laid out in a geometric pattern such as linear, circular or 2×2 matrix. A server 110 located at the UAV site 106, or located at another location in communication with the UAV site 106, may implement an algorithm to optimally schedule landings and launchings of UAVs at the site 106 in such a way as to minimize the distance vectors and timing between various UAVs operating at the site 106. The algorithms may be employed to minimize risk of collision and maximize the spacing and time between UAC landings and launches.

In some embodiments, the radio base station 104 or server 110 or a stand 11 monitors the flight path of the UAV 10 by receiving position data from a GPS receiver of the UAV 10 and comparing the position to a flight path stored at the radio base station 104 or server 110. In some embodiments, the radio base station 104 or server 110 monitors the flight paths of multiple UAVs and send flight control signals to a UAV so as to avoid collisions. In some embodiments, tracking of the UAV may be passed from one radio base station 104 or server 110 or stand 11 to another as the UAV travels from one cell to another or from one network domain to another or from one stand vicinity to another. A handoff procedure may be followed to hand off control of the UAV from one radio base station 104 or server 110 or stand 11 to another radio base station 104 or server 110 or stand 11.

In some embodiments, complete control of the flight path of the UAV is retained by the UAV until it is near a destination stand. In some embodiments, the flight path of the UAV may be controlled by each of one or more radio base stations 104 or servers 110 or stands 11. Note that in some embodiments, a radio base station 104 and/or the server 110 may be located at the warehouse 106 and/or at the customer premises 108.

In some embodiments, a central communications point such as a mobile management entity (MME) or a radio base station 104 or a server 110 may monitor flight of a plurality of UAVs 10, and may monitor the activities of a plurality of stands 11 in a network of stands 11. For example, the server 110 may keep track of which UAVs 10 have landed or taken off from each of a plurality of stands in the network of stands 11. This tracking may include accounting to facilitate charging an owner of a UAV 10 and payment to an owner of a stand 11 at which the UAV 10 is serviced. The accounting may include, for example, a fee for the use of the stand, a fueling charge, a charge for recharging the UAV 10, a charge for loading or unloading a payload onto or from the UAV 10, and a fee for storing the UAV at or near the stand 11.

The network of stands 11 allows for longer flights and enables regulation of UAV traffic in an airspace. Algorithms implemented by the radio base station 104 or server 110 may enable a stand to be identified as nearest or otherwise optimally located to provide recharging/refueling of a UAV 10. In addition, the flight course may be configured to make the flight course efficient according to some predefined standard. Thus, for example, the flight course of one or more UAVs may be configured to distribute launching and landing as evenly as possible among a group of stands in a network of stands. The flight course may be tailored to the application such as using one or more stands for continuous operation or using one or more stands to extend flight range. In some embodiments, a flight course determination algorithm may determine a flight course that minimizes the number of launches/landings of a UAV between an origin and destination, for example. In some embodiments, a flight course determination algorithm may determine a flight course that maximizes use of stands of a particular network of stands owned or operated by one entity and/or to avoid stands owned or operated by another entity.

The stand network may be displayed on a computer monitor that is observed by a human who interacts with a computer of the base station 104 or server 110 acting as a control center to monitor and adjust flight paths for one or more UAVs 10. UAVs in flight may also be displayed on the computer monitor. In an emergency or due to an unanticipated loss of power, a UAV 10 may be redirected to a nearest stand or another stand not as near. A UAV flight course may be altered via of a user interface at the control center to avoid a collision, for example. The UAV flight course may be altered or specified based on one or more of a plurality of factors such as, stand availability, stand services, stand ownership and stand location.

Note that a stand may provide some services and not others. For example, some stands may not provide refueling, or may not provide package unloading and/or loading, or may not provide maintenance or repair, while other stands may provide these services. The base station 104 or server 110 or other control center may take the available services into account when selecting stands along a route of the UAV 10. Note also that a stand 11 may be owned by one entity and a UAV 19 that lands at the stand 11 may be owned by another entity.

The radio base station 104 or server 110 may alert a stand, such as stand 11*a*, that it is a destination of an identified UAV and that the identified UAV is approaching. This may cause the stand 11*a* at the customer premises 108 to "wake up" from a passive, or sleep mode and seek to establish communication with the identified UAV. Alternatively, the stand may be notified of the approaching UAV by the UAV itself. Once communication between the UAV and the stand 11*a* is established, the stand may determine that the UAV is near enough to the stand 11*a* to takeover flight control of the UAV to guide the UAV onto the stand and to land the UAV on the stand.

The stand 11 may communicate with the UAV 10 to direct the UAV to land, to delay landing for a period of time by hovering, or to cause the UAV 10 to travel to another stand. If multiple UAVs are requesting to land, the stand 11 may prioritize the sequence in which the UAVs land. Note that a UAV may signal an emergency override in which case any open stand in the network or in another stand network may be directed to accept the UAV for emergency landing, such as when the UAV is malfunctioning or is short of fuel or electrical charge. Under these circumstances, a private stand may be forced to allow a UAV to land in order to ensure public safety.

If the UAV does not receive a landing signal from the stand 11, the UAV may request a location of an alternate stand from the radio base station 104 or the server 110. Alternatively, the UAV 10 may return to its home location. Once communication is established between the UAV 10 and the stand 11, a peer to peer relationship between the two devices may be created to land or launch the UAV 10.

Figure 11:
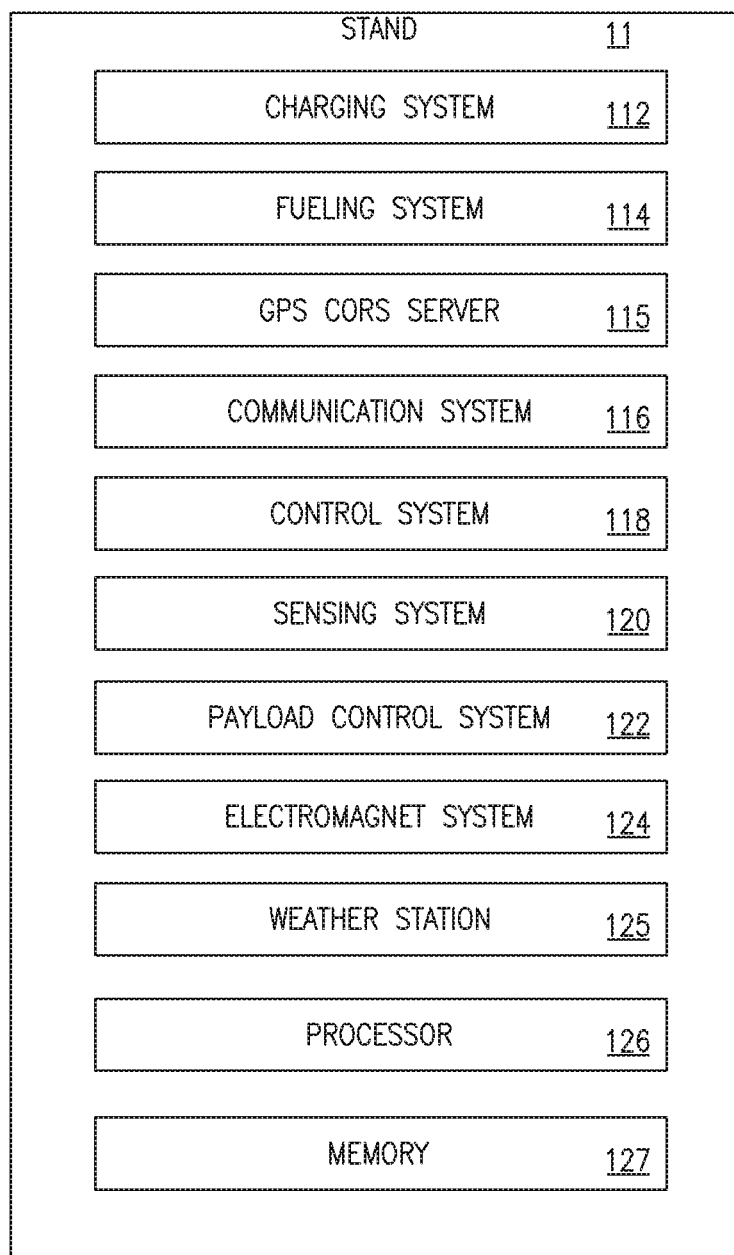
FIG. 11 is a block diagram of a stand.

FIG. 11 is a block diagram of the stand 11 and some of its systems. The stand 11 includes a charging system 112 which may include a conductor coupled to a shaft 22. The charging system may optionally include a power supply and an AC to DC converter. The stand 11 also may include a fueling system 114 that includes a fuel tank, a fuel pump and a fuel nozzle. The fuel tank, the fuel pump and the fuel nozzle may be provided in addition to the fluid tank 54, the fluid pump 56 and fluid nozzle 52.

The stand 11 may also include a GPS CORS server 115 to facilitate accurate determination of position of a UAV 10 in the vicinity and seeking to land. The stand 11 may also include a communication system 116 that enables the stand to communicate with a UAV 10, another stand 11, a base station 104 and a server 110 and to receive GPS satellite signals. Some or all of the communications may be encrypted. For example, the communication system 116 may include a cellular radio, a GPS radio, a WiFi radio and/or a proprietary radio. The cellular radio may be configured to communicate with the radio base station 104. The GPS radio may include a GPS receiver to receive satellite signals that are used to determine position, or may include a receiver to receive position information from a GPS radio mounted on the UAV 10. The WiFi radio or proprietary radio enables communication of control signals and data between the stand and the UAV. Note that the term "to communicate with" includes one way communication, two-way communication or broadcast communication.

Information communicated from the stand 11 to the UAV 10, to the radio base station 104, and/or the server 110 may include an identity of the stand, an operational condition of the stand and services provided by the stand. The operational condition of the stand may include an availability of the stand for landing or launching, an amount of fuel available at the stand, and an identity, weight and quantity of payloads deliverable from the stand 11. Services provided by the stand 11 may include, refueling, recharging, material, package or fluid upload or download to or from the UAV 10, UAV maintenance and repair.

For example, when the UAV 10 is operating under the control of the stand 11, when landing or launching, a radio of the communication system 116 of the stand 11 receives sensor data from the UAV 10 and may transmit control signals to the UAV 10. The sensor data is received by a control system 118 which utilizes the sensor data to generate the control signals that control the flight of the UAV 10. Note that the control system 118 may also control clamping mechanisms 82 to enable or prevent landing or launching, and may also control a plurality of electromagnets along an extent of one or more of the shafts 22 to facilitate landing or launching of a UAV 10.

The stand 11 may further include a sensing system 120 that includes sensors mounted on the stand. For example, accelerometers may be mounted on the shafts 22 to sense when the UAV makes contact with the rails. As another example, a laser altimeter may be mounted on the stand 11 to sense the altitude, rotational alignment or lateral displacement of the UAV 10. These and other sensors may generate data that is also used by the control system 118 to generate control signals that control the flight of the UAV 10.

In some embodiments, the sensing system 120 may include the sensor/sources 28 that work in conjunction with reflectors 18 of the UAV 10. These sensors which may be optical or RF, for example, may be used to determine height of the UAV 10 and/or rotational orientation of the UAV and may also be used to determine lateral displacement of the UAV 10. The sensing system 120 may include software stored in the memory 127 and executed by a processor 126 of the electronics of the stand to process the light or RF energy detected by a sensor to ascertain the height, rotational orientation and lateral displacement of the UAV 10. In some embodiments, the rotational or translational alignment of the UAV 10 can be determined by imagery captured by a video or infra-red (IR) camera mounted on the UAV 10 as the UAV approaches the stand from above. In these embodiments, the UAV 10 may transmit to the stand 11 information concerning motion of the shafts 22 of the stand 11 needed to align the stand shafts 22 with the collars 16 of the UAV 10.

This determination of UAV position relative to the stand 11 may be made in conjunction with GPS position information from a GPS receiver on board the UAV 10 or on the stand 11. The determination may be based on fuzzy logic or statistical algorithms and based on merging and/or evaluation of data from multiple sensors. The sensors may sense signal amplitude or phase. The software of the sensing system 120 may use pattern recognition to determine rotational orientation as well as lateral displacement. In some embodiments, the bottom of the UAV may be shaped or have a target affixed or painted thereon that enables a more accurate determination of lateral displacement and/or rotational orientation.

Based on the determination of UAV height, rotational orientation and lateral displacement, the sensing system 120 may send signals to the control system 118 to indicate that the UAV 10 is aligned with the stand such that the collars 16 of the UAV 10 are aligned with the shafts 22 of the stand 11.

The sensing system 120 may include a long range sensor to determine the height of the UAV 10 when it is a longer distance away from the stand 11 that precludes use of the height, rotational orientation and lateral displacement sensors discussed above. The long range sensor may be used to detect when the UAV 10 is hovering above the stand prior to landing or after launch and the height of the UAV 10.

The stand 11 may also include a payload control system 122. The payload control system 122 may include mechanical assemblies to receive a payload from the UAV 10 or transfer a payload to the UAV 10. The mechanical assemblies may include clamps to secure-ably affix the payload to the UAV 10. The clamps may be released to release the payload from the UAV. The clamps may be controlled by the control system 118. Note also that the payload may be a liquid or gas, and the payload system of the stand 11 may include piping and pumps to transfer the fluid. In some embodiments, the UAV 10 may carry a package for delivery, such as a package of documents or commercial instruments. The payload control system 122 may cause the package to be released by the UAV 10 upon landing, and a conveyor system or human can remove the package away from the stand. For example, some stands may have a slide structure such as a chute that receives the released package and allows the package to slide in a generally downward direction to a collection bin located away from the stand. Thus, in some embodiments, the UAV 10 has clamps or other package holding mechanisms that can be instructed by the stand 11 to release or grasp the package. In some embodiments, the stand 11 includes or is integrated with equipment that positions a package to be grasped or captured by a grasping or holding mechanism of the UAV 10.

An electromagnet system 124 includes a plurality of electromagnets, such as, for example, at least one electromagnet on at least one shaft 22, to attract the UAV during landing or to propel the UAV during launch. The electromagnets may be controlled by signals from the control system 118.

A processor 126 may be employed to operate under the direction of software to perform functions of the elements of the stand 11 discussed above. The memory 127 may store information relevant to the UAV, the payload and the stand 11. For example, the memory 126 may store an identification of the UAV, a payload identification, an address of the stand, a maintenance schedule, a flight plan, and various control and sensor states.

Figure 12:
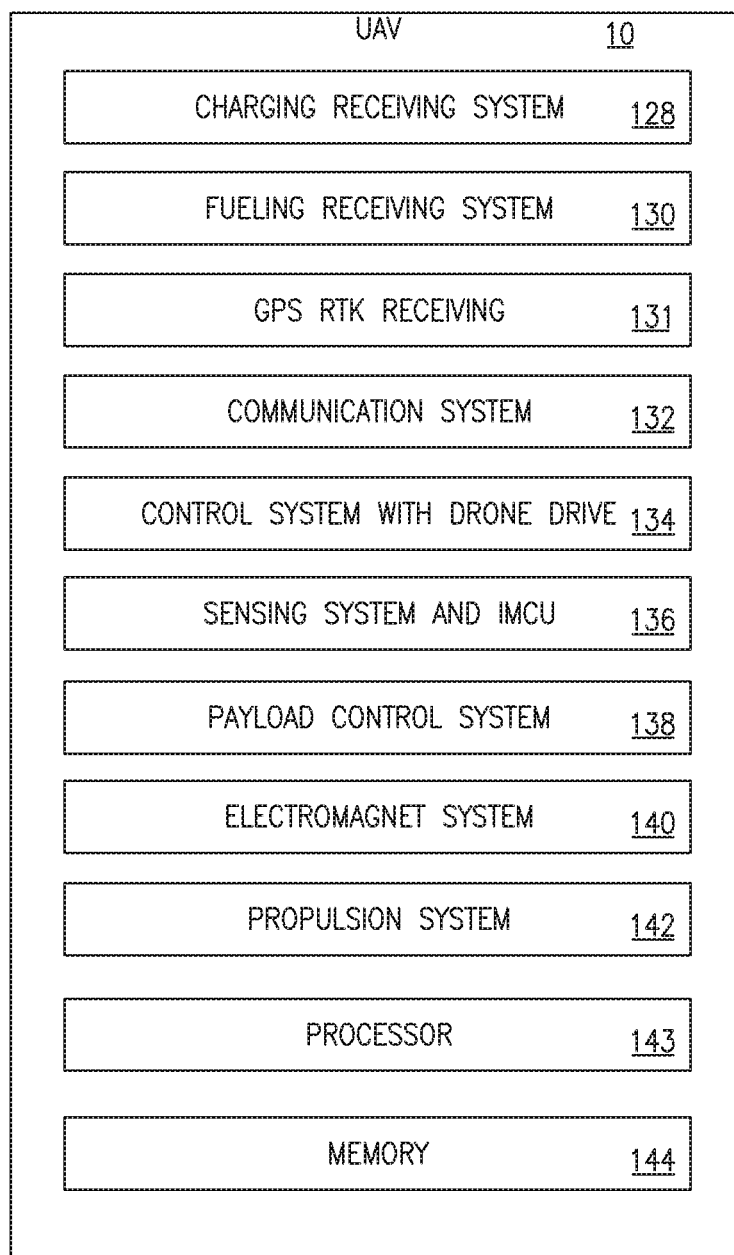
FIG. 12 is a block diagram of a UAV.

FIG. 12 is a block diagram of a UAV 10. The UAV 10 may include a charge receiving system 128 that may include the conductor 74, the connecting spring assembly 76, conductors 78 and a battery. The UAV 10 may also include a fuel receiving system 130 that includes an orifice for receiving a fuel nozzle of the stand 11, and a fuel tank for receiving the fuel.

The UAV 10 may also include a GPS RTK receiver 131 to facilitate accurate determination of the position of the UAV 10. The GPS RTK receiver 131 may receive GPS satellite signals and signals from a nearby stand 11 as well as other stands equipped with a GPS CORS server 115. The UAV 10 may also include a communication system 132 which may include a cellular radio, a WiFi or proprietary radio, a collision avoidance system and an FAA transponder. The cellular radio may be in communication with the base station 104. A transmitter may transmit UAV position to the stand 11 or to the radio base station 104 or to the server 110. The WiFi or proprietary radio may transmit sensor data to the stand 11 and receive control signals from the stand 11.

A control system 134 may generate control signals to control or influence flight of the UAV. The control signals of the control system 134 may be based on control signals received from the stand 11 when the UAV is operating under control of the stand 11. In some embodiments, the control system 134 of the UAV 10 includes control electronics that are interposed between the control electronics that control the UAV 10 during normal flight between stands, and the propulsion system of the UAV 10. In some embodiments, the interposed control electronics, referred to herein as drone drive electronics, take control of a propulsion system 142 that include propellers 12 and motors 20 when the UAV 10 is landing or launching, as explained further below. In some embodiments, the drone drive electronics do not wholly supplant control signals of the control system 134, but instead supplement or alter these control signals to influence flight of the UAV 10. These and other embodiments of the drone drive electronics are discussed below.

A sensing system with IMCU 136 includes sensors of the UAV, such as gyroscopes, accelerometers, magnetometers, pressure sensors, laser and/or optical sensors, mounted on the rails 14 of the UAV. These accelerometers sense pitch, roll, yaw, altitude and direction and their signals are used to control the flight of the UAV. The signals from the UAV sensors and IMCU may be sent to the control system 118 of the stand 11. These sensors of the UAV 10 may be separate from sensors of the drone drive electronics.

The UAV 10 may also include a payload control system 138 for attachment and detachment of a payload. The UAV 10 may also include an electromagnet system 140 that may include the electromagnets 80 of the collar 16 of the UAV 10, which are activated during the landing procedure. The UAV 10 also includes the propulsion system 142 which includes the propellers and propeller motors, and optionally, RPM sensors. Also, the UAV 10 includes memory 144 which stores information relevant to the UAV, the stand and the payload, such as identifiers, addresses and control states. The UAV may also include a processor 143 and memory 144. The memory 144 stores information and executable instructions that when executed by the processor 143, configure the processor 143 to perform functions of the elements of the UAV 10 described herein.

Figure 13:
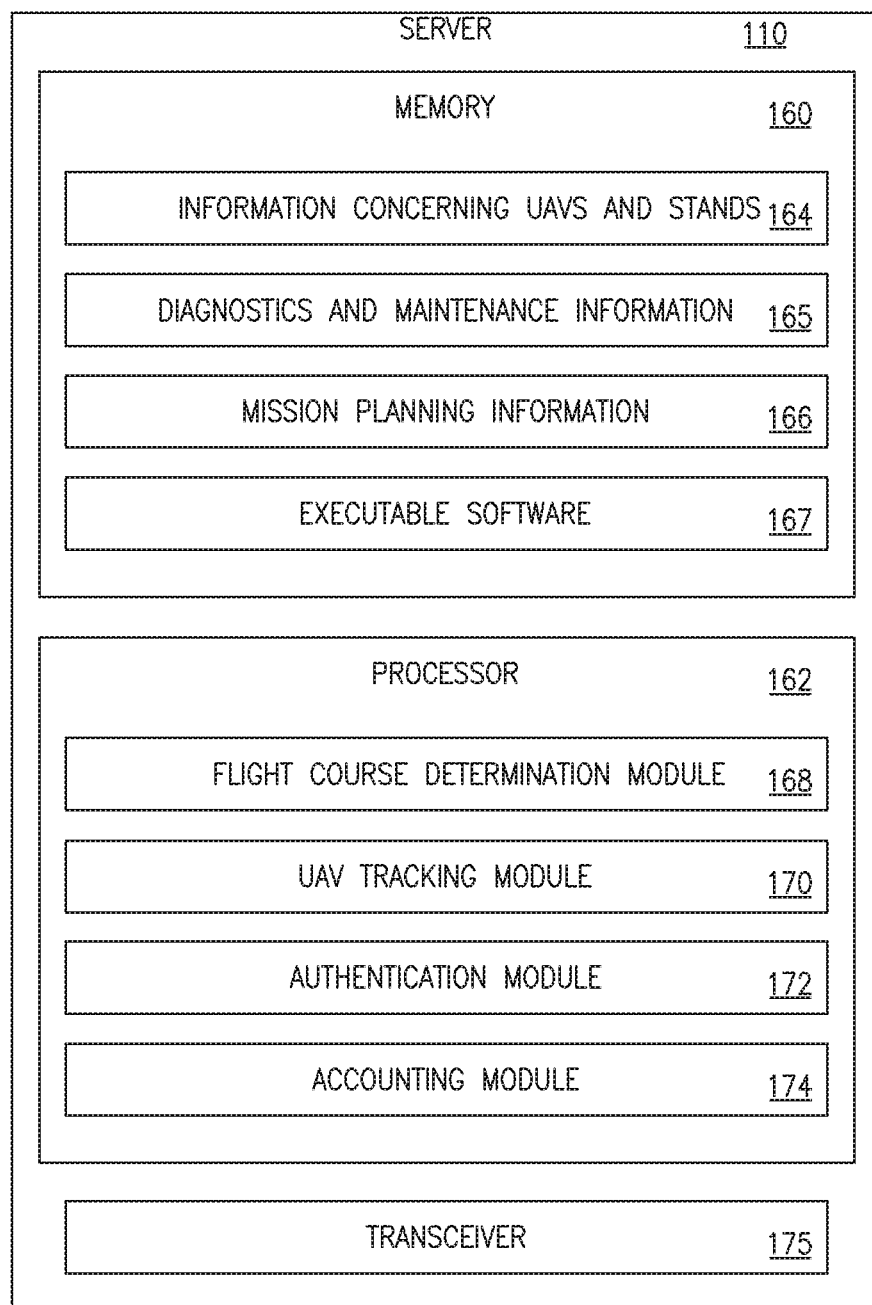
FIG. 13 is a block diagram of a base station.

FIG. 13 is a block diagram of an embodiment of the server 110. The server 110 may include a memory 160 and a processor 162. The memory 160 stores information 164 concerning UAVs 10 and stands 11. This information may include identities and locations of stands, stand capabilities (such as refueling and maintenance capabilities), stand owner, identities and current positions of UAVs, flight information for UAVs, UAV owner, and UAV capabilities (such as payload capacity and payload type). A stand identity may include, for example, a uniform resource locator or Internet address. The stand location may be references to earth longitude, latitude and altitude, as determined by a GPS receiver located at the stand. The stand locations of a network of stands may be provided to and displayed on a computer on a map such as a Google® map. The computer may be located at a stand 11, a base station 104, a server 110, a UAV site 106, and/or a customer premises 108.

The memory 160 also includes diagnostics and maintenance information 165 concerning at least one UAV 10. This information 165 may include information presently being gathered as well as historical information. The memory 160 also includes mission planning information 166, which includes route information, scheduled landing and launch times and locations, stand availability and capability information, and other information relevant to flight mission planning. The memory 150 also includes executable software 167 that when executed by the processor 162, configures the processor to perform server functions discussed herein.

The processor 162 may implement a flight course determination module 168 to determine a flight course for a UAV 10 using knowledge of the UAV, its mission, and stand locations and capabilities. The flight course information may include estimated arrival and departure times at each stand for a UAV. A UAV tracking module 170 may track UAVs using position information obtained from the UAVs via radio base stations 104, other servers or stands 11. In some embodiments, the processor 162 may implement an authentication module 172 to authenticate a UAV and to confirm the identity and authorization of the UAV to land at a particular stand.

The processor 162 may also be configured to enable an operator to add or remove stands 11 from a network of stands monitored by the server 110 and to thereby define the network of stands. Thus, the server 110 may monitor and manage a plurality of selected stands, schedule landings and launchings at the stands, schedule maintenance at the stands, and receive and transmit diagnostic information to and from the stands. The server may also store a historical record of UAV 10 and stand 11 characteristics and use this information to perform diagnostic testing of a UAV 10 and stand 11 at a time of launch of the UAV 10 from the stand 11. The current results of testing can be compared to historical testing to aid in diagnostic evaluation of the stand 11 and/or the UAV 10.

An accounting module 174 may be implemented to keep track of payments and charges relating to use of stands by UAVs. The accounting may include, for example, a fee for the use of the stand, a fueling charge, a charge for recharging the UAV 10, a charge for loading or unloading a payload onto or from the UAV 10, and a fee for storing the UAV at or near the stand 11. Thus, a UAV owner may be charged for the UAV's use of a stand and maintenance and refueling at the stand. The accounting module may provide an accounting report to a UAV owner and/or a stand operator that details activities and charges and payments associated with a UAV and with a UAV's use of a stand.

Note that the server 110 may include a keyboard, a mouse, and a video monitor that displays a graphical user interface (GUI) that enables an operator to view and interact with one or more UAVs and stands and to monitor and interact with flight of one or more UAVs, to monitor UAV and stand status, and to monitor and interact with diagnostics, maintenance schedules, test results, and other information. The server 110 may also display flight course information and flight paths of UAVs. The server 110 may also permit automated or operator controlled collision avoidance and flight path correction.

Note that functions performed by a server 110 may also, or instead, be performed by the radio base station 104. Similarly, functions performed by the radio base station 104 may also, or instead, be performed by the server 110. Also, note that a server and a stand may be collocated. Thus, a network of stands controlled and/or monitored by one or more servers may be provided. By networking the stands, a server 110 may provide a flight plan from origin to destination, including stops there between. By refueling or recharging at intermediate stands along the way, the distance of a flight may be increased.

As noted, a stand may be identified based on its capabilities, such as whether maintenance is offered, whether refueling is offered, whether a stand is public (open to all UAVs) or private (open to only certain authorized UAVs). The locations, capabilities and services offered by a stand may be displayed on a computer accessible by a UAV owner or server operator. Such information may be overlayed on a map that shows locations of stands in a region. Map features such as provided by Google® maps such as zoom-in and zoom-out may be provided. The information provided may also include types, makes and models of UAVs that may be serviced by a stand 11.

Figure 14:
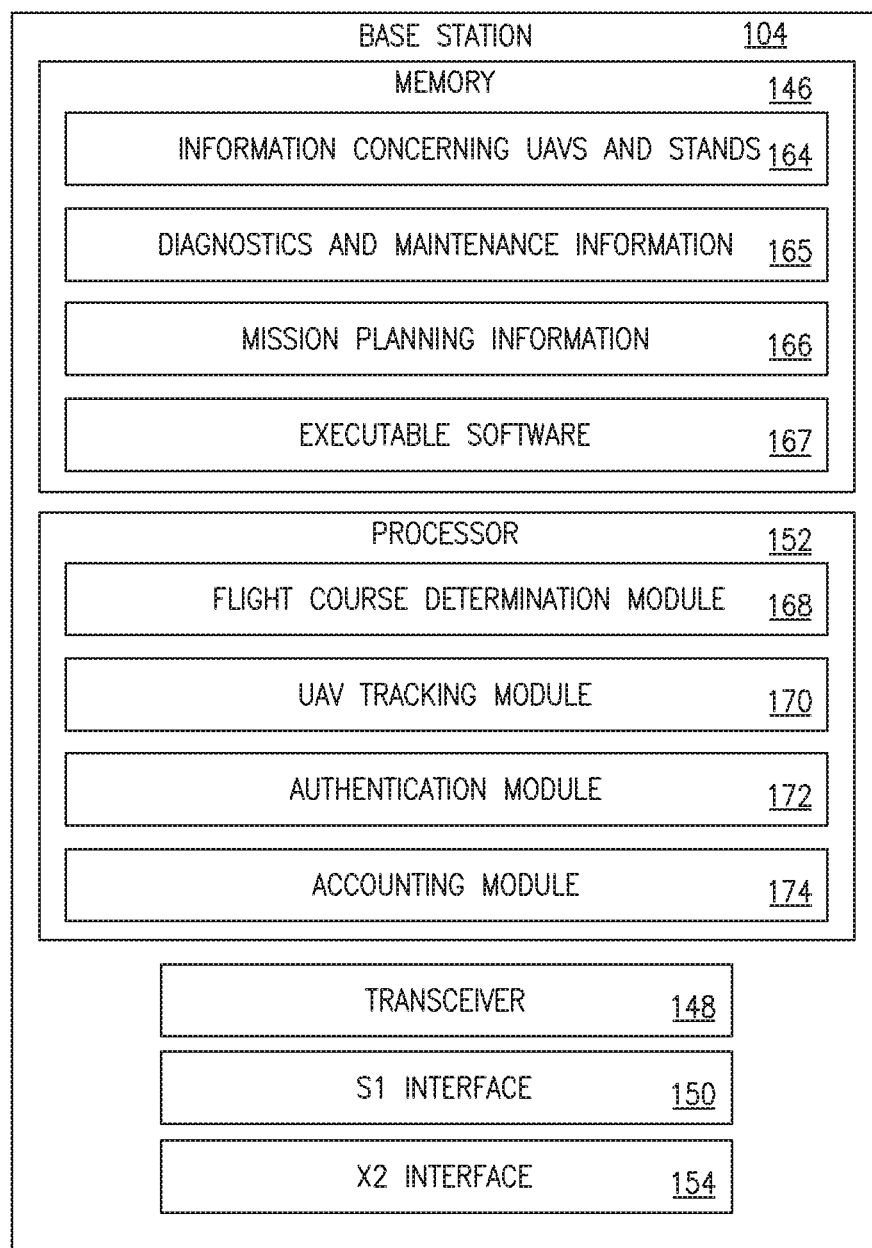
FIG. 14 is a block diagram of a server.

FIG. 14 is a block diagram of an embodiment of a radio base station 104 for communication with a plurality of UAVs 10 and stands 11. The radio base station 104 includes a memory 146, a transceiver 148, an S1 interface, a processor 152, and an X2 interface. The radio base station 104 may be collocated with a stand 11 and/or a server 110. The radio base station 104 may also include a GPS receiver and a broadband communication link such as an Internet connection, satellite, near field RF communications and/or cellular/mobile connection.

The memory 146 is configured to store information 164 concerning a plurality of UAVs and stands. This information may include UAV identifiers, stand identifiers and addresses, UAV position coordinates, UAV destination, UAV origin and UAV flight course information. The memory 146 may also include diagnostics and maintenance information 165 concerning at least one UAV, mission planning information 166 and executable software 167.

The processor 152 may execute software or be implemented by application specific integrated circuitry. The processor 152 may implement a flight course determination module 168 that computes flight course information for a UAV using knowledge of a current position of the UAV and the destination stand of the UAV. The processor 152 may also implement a UAV tracking module 170 to track a flight of one or more UAVs.

The processor 152 may also implement a collision avoidance routine to avoid collisions of the UAVs the tracking module 158 is tracking. For example, when the tracking module determines that two UAVs are too close together or are on a collision course, the collision avoidance routine may redirect the flight course of one or both of the UAVs.

The processor 152 may also implement an authentication module 172 and accounting module 174, as described above with reference to the server 110.

The transceiver 148 may transmit information concerning a UAV to the UAV. For example, the transceiver 148 may transmit flight course information to the UAV. The transceiver 148 may receive encrypted and/or unencrypted information from a UAV, from the UAV site 106, another radio base station 104, a server 110, a UAV 10 and/or a stand 11. For example, the transceiver 148 may receive position coordinates from one or more UAVs and/or may receive information concerning status of a stand 11.

The S1 interface 150 provides a link and protocol for the radio base station 104 to communicate with an upstream telecommunications unit such as a mobile management entity (MME) or serving gateway (SGW). The X2 interface provides a link and a protocol for the base station 104 to communicate with other radio base stations 104.

Note that the radio base station 104 may include a keyboard, a mouse, and a video monitor that displays a graphical user interface (GUI) that enables an operator to view and interact with one or more UAVs and stands and to monitor and interact with flight of one or more UAVs, to monitor UAV and stand status, and to monitor and interact with diagnostics, maintenance schedules, test results, and other information.

Stands 11 may report heart beat signals that include station information to the radio base station 104, server 110, the UAV 10 or to other stands 11. In this way, the radio base station 104 and/or the server 110 may know the current condition of the stand 11 including whether it is operational and ready for UAV landings and launches. Stands 11 may also report maintenance and supply status to a UAV 10 and/or radio base station 104 and/or server 110 so that if supplies are running low or if maintenance is required, the UAV 10 may establish a connection with another stand and so that service personnel may be notified of the need for resupply and/or maintenance.

Figure 15:
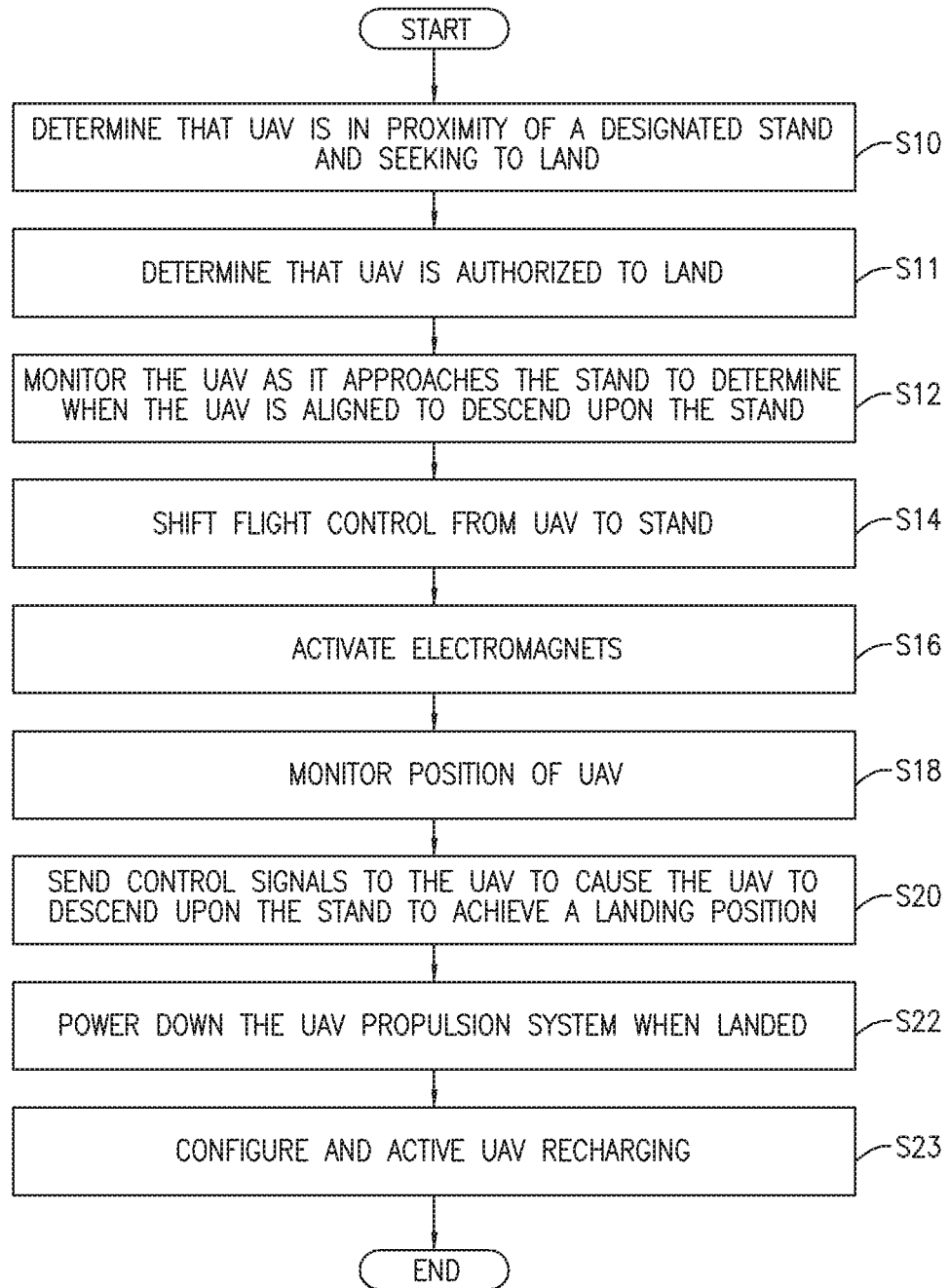
FIG. 15 is a flowchart of an exemplary process for landing a UAV on a stand.

FIG. 15 is a flowchart that provides an overview of a process for landing a UAV 10 on a stand 11. The stand determines when the UAV is in proximity to the stand and seeking to land (block S10). This determination may be based on a signal from the UAV, a signal from a radio base station 104, and/or from a sensor or a camera on the stand itself. The stand 11 may also determine whether the UAV 10 is authorized to land at the stand 11 (block S11). The stand 11 may notify the UAV 10 whether to begin landing, to hover while waiting to land, or to go to another stand. If a UAV 10 does not receive a signal from the stand 11, the UAV may communicate with the radio base station 104 or the server 110 via the stand 11 to reroute the UAV to another stand or to return home, i.e., to its location of origin.

The stand monitors the UAV as it approaches the stand to determine when the UAV is aligned to descend upon the stand (block S12). As the UAV approaches a descending position above the stand 11, UAV flight control is augmented with the stand control (block S14). The UAV and/or stand altimeter may be activated to aid in automated landing and the electromagnets which attract the UAV to the stand may be activated (block S16). The position and orientation of the UAV is monitored as it lands (block S18). Control signals are sent to the UAV to cause the UAV to descend or ascend on the stand to achieve a landing position (block S20). Upon landing, the UAV may be powered down (block S22). The stand 11 may be configured and activated to recharge the UAV 10 (block S23).

Figure 16:
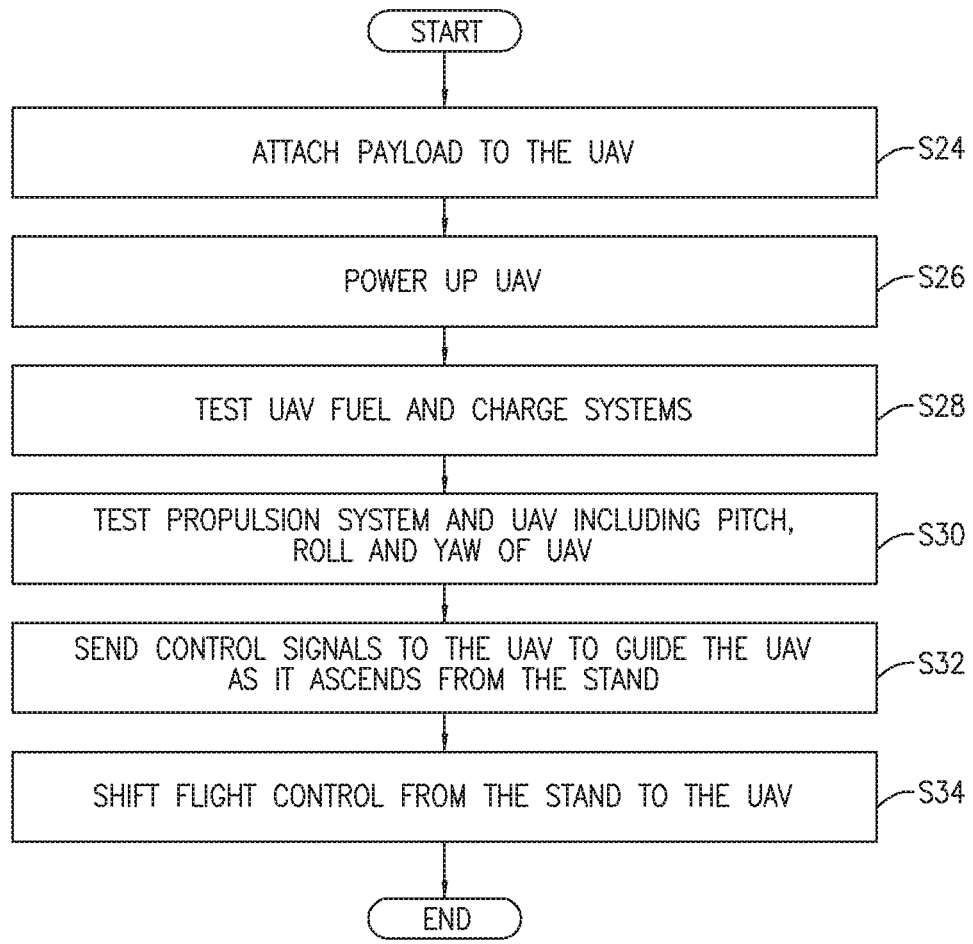
FIG. 16 is a flowchart of an exemplary process for launching a UAV from a stand.

FIG. 16 is a flowchart that provides an overview of a process for launching a UAV 10 from a stand 11. A payload may be attached to the UAV 10 (block S24). The UAV is powered up (block S26). Fuel and charging systems may be tested (block S28) prior to refueling and recharging. The propulsion system of the UAV may be tested including stability tests when the UAV is caused to pitch, roll and yaw while on the stand (block S30). Control signals are sent from the stand to the UAV as it ascends from the stand (block S32). Once the UAV has ascended from the stand, flight control may be transferred from the stand 11 to the UAV 10 (block S34).

Figure 17:
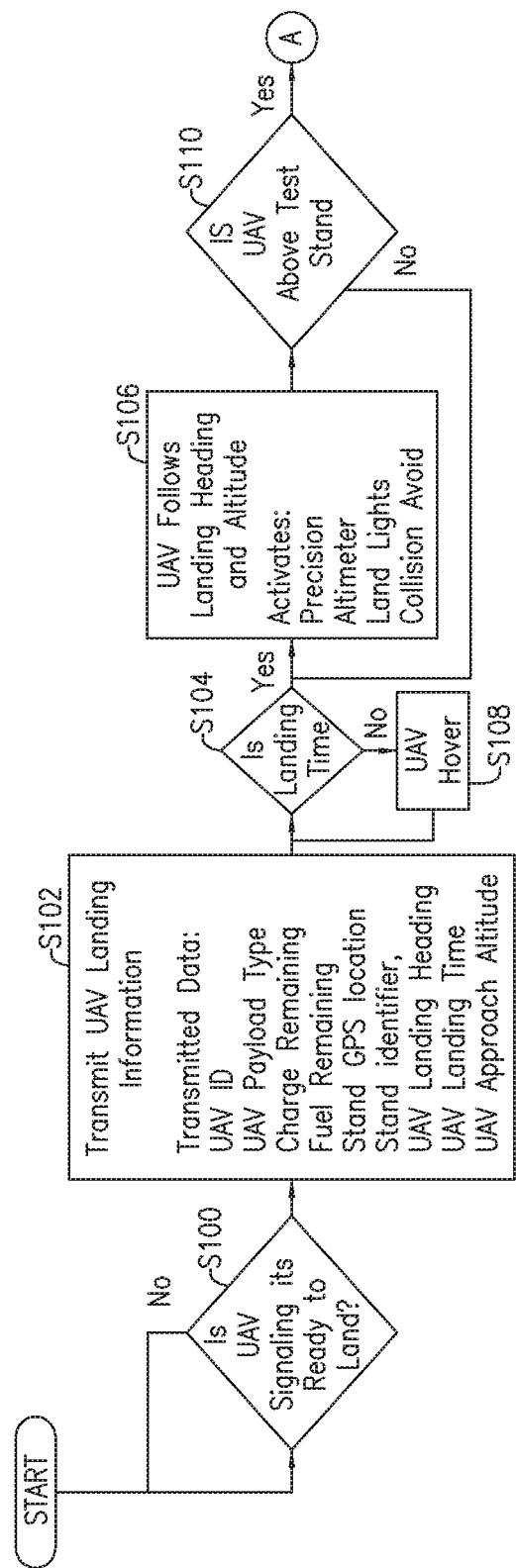
FIG. 17 is a flowchart of a first operational level of a landing procedure.

FIG. 17 is a flowchart of a first operational level of a UAV landing procedure according to some embodiments. The stand 11 monitors to receive a signal from the UAV 10 indicating that the UAV is ready to land (block S100). The UAV 10 may download UAV landing information (block S102). In some embodiments, the UAV landing information may include UAV identification, UAV payload identification and/or type, remaining battery charge, remaining fuel, GPS location of the stand 11, stand identifier, UAV landing heading, UAV landing time, and UAV approach altitude.

Figure 18:
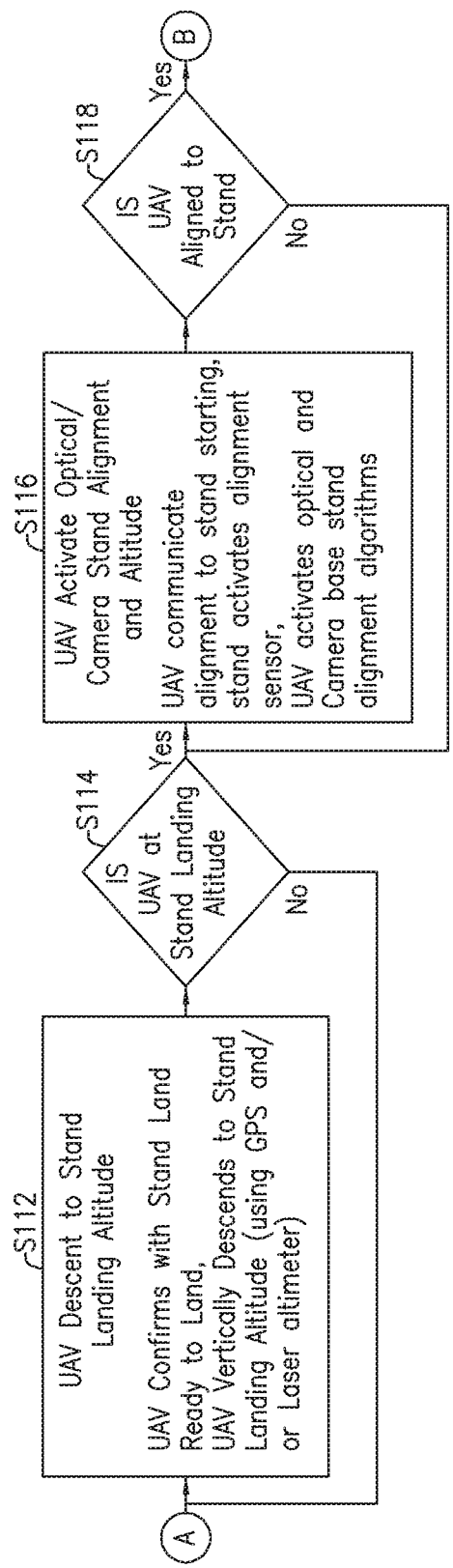
FIG. 18 is a flowchart of a second operational level of a landing procedure.

If the time is a time of landing (block S104), the process proceeds to block S106. If it is not time for landing, the UAV may hover about the stand 11 (block S108). At landing time, the UAV follows a landing heading and altitude (block S106). Control electronics of the stand 11 may be activated. The UAV activated electronics may include a precision altimeter, landing lights and collision avoidance algorithms. If the UAV is above the stand 11 (block S110), the process continues to a second operational level of the UAV landing procedure, as shown in FIG. 18. In some circumstances, the UAV 10 may request an emergency landing. In this case, the UAV 10 may be given priority to land and may override the request to hover and wait for landing priority.

In some embodiments, the stand 11 may execute a collision avoidance algorithm that determines when the UAV 10 is on a collision course with another UAV. The stand 11 may redirect the flight heading of the UAV 10 to avoid UAV collisions. The UAV 10 and stand 11 may work in concert to activate sensors and control algorithms to coordinate a landing position and orientation onto the stand 11. The stand 11 may also coordinate a landing time and notify of landing status, including whether to land, hover or transfer to another stand.

In FIG. 18, the UAV 10 descends to stand landing altitude (block S112). In this block, the UAV 10 confirms to the stand 11 that the UAV 10 is ready to land. The UAV 10 vertically descends to stand landing altitude by using, for example, a long range optical sensing system, while confirming height above the stand 11 using GPS, pressure or a laser altimeter and video imagery as the UAV 10 approaches its landing position. When the UAV 10 reaches stand landing altitude (block S114), the UAV 10 may activate optical or camera stand alignment (block S116). In this block, the UAV 10 communicates alignment with the stand to the stand control electronics. The stand 11 activates alignment sensors. The UAV 10 activates optical and camera base stand alignment algorithms. For example, the UAV 10 may have a camera that looks at a target on the stand 11 and determines an amount of rotation or translation needed to align the UAV 10 to the stand 11. In some embodiments, the UAV 10 may send a signal to the stand 11, instructing the stand 11 to rotate and/or translate the shafts 22 of the stand 11 to bring them into alignment with the UAV 10. In some embodiments, a base plate of the stand 11 is actuated to rotate to an orientation to receive the UAV 10 based on an inertial heading communicated from the UAV 10. A determination is made whether the UAV is aligned to the stand (block S118). Rotational adjustments may be made until alignment is achieved. When alignment is achieved, the process continues to a third operational level of the UAV landing procedure, as shown FIG. 19.

Figure 19:
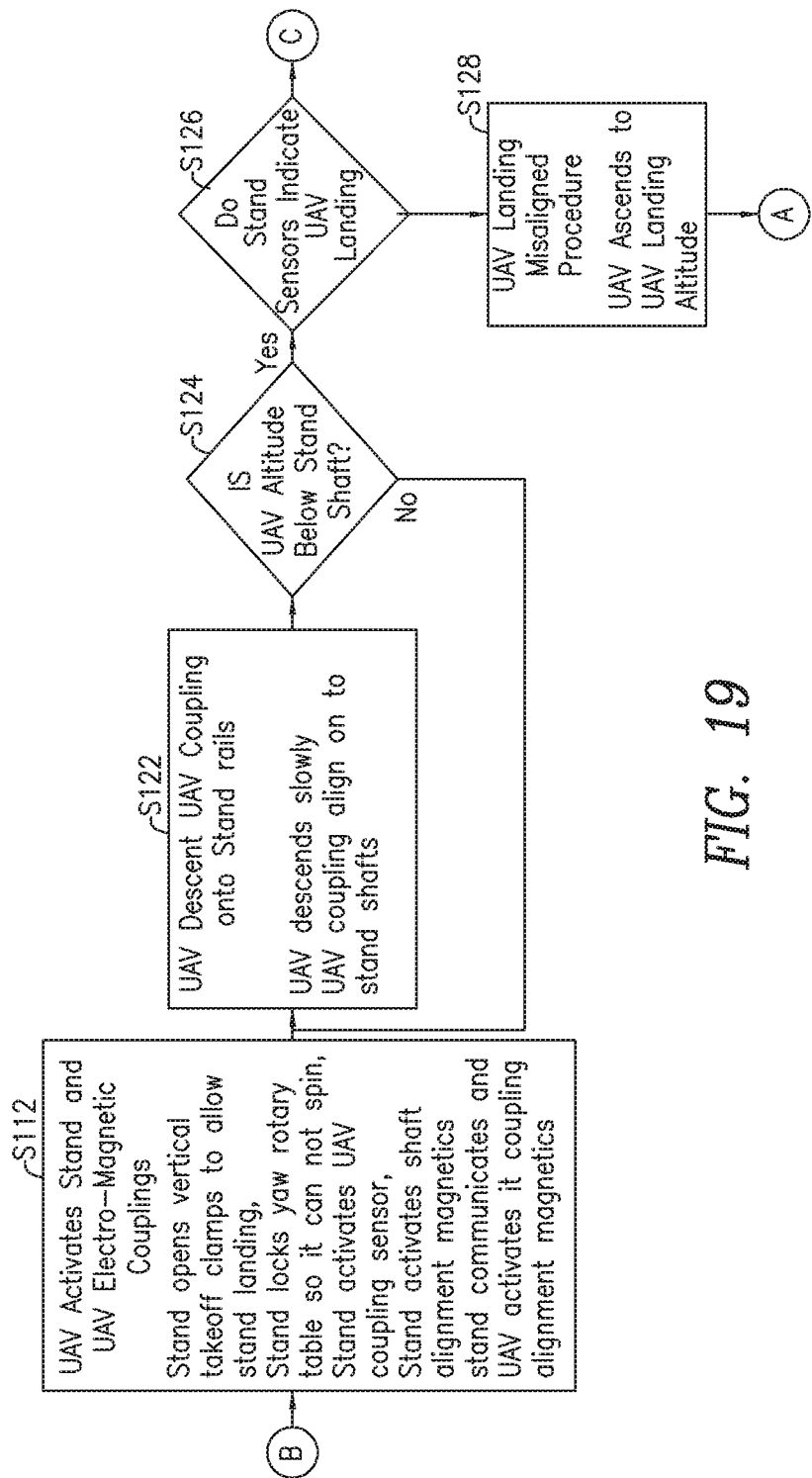
FIG. 19 is a flowchart of a third operational level of a landing procedure.

In FIG. 19, the UAV 10 activates stand and UAV electromagnetic couplings (block S120). In this block, the stand 11 compresses the vertical takeoff clamps to allow the UAV 10 to land. The stand 11 locks the baseplates 30 and 32 to prevent yaw during landing. The stand 11 activates UAV coupling sensors and activates shaft alignment magnetics. The stand 11 also causes activation of the UAV coupling alignment magnetics. The UAV descends so that the fittings or collars 16 couple to the stand shafts 22 (block S122). If this does not occur, the process may return to block S122.

If the UAV altitude is below the top of the shafts 22 (block S124), the process proceeds to determine whether the stand sensors indicate that the UAV 10 is landing (block S126). If not, a determination is made that the UAV landing is misaligned (block S128). The UAV 10 ascends to the UAV landing altitude and the process returns to block S112. If the stand sensors indicate that the UAV 10 is landing, (block S126), the process continues to a fourth operational level of the UAV landing procedure, as shown in FIG. 20.

Figure 20:
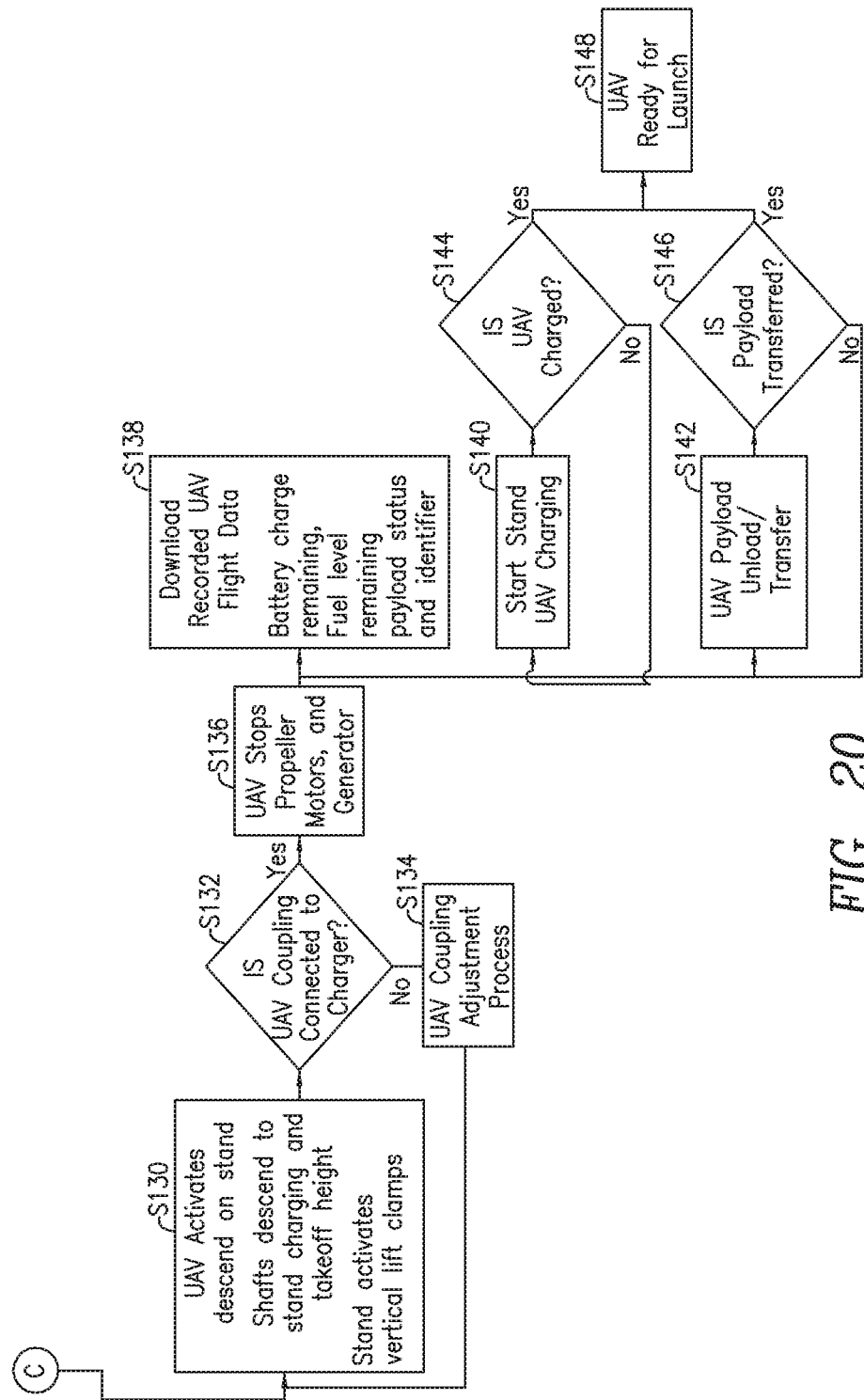
FIG. 20 is a flowchart of a fourth operational level of a landing procedure.

In FIG. 20, the UAV 10 activates its descent on the stand rails and descends to the stand charging and takeoff height and the stand activates the vertical lift clamps 82 (block S130). A determination is made whether the UAV 10 is connected to the charger (block S132). If not, a UAV coupling adjustment procedure is performed (block S134). In some embodiments, the polarity of the charge coupling connections is determined, and using relays or other electronic or manual switches, the charge power 280 and ground 282 is correctly routed to the appropriate coupling. In some embodiments, the orientation of power and ground is mapped identically on the charge couplings so this adjustment may not be applied. If the coupling is connected to the charger, the UAV 10 stops its propellers, motors and generator (block S136).

The UAV 10 may download its recorded UAV flight data (block S138). In this block, the downloaded data may include battery charge remaining, fuel remaining, payload status and identifier, etc. In addition to, or in the alternative, the stand 11 begins charging the UAV battery. A payload unload and transfer process may be performed (block S142). If the UAV is charged and/or fueled (block S144), and the payload is transferred (block S146) then the UAV is ready for launch (block S148).

Figure 21:
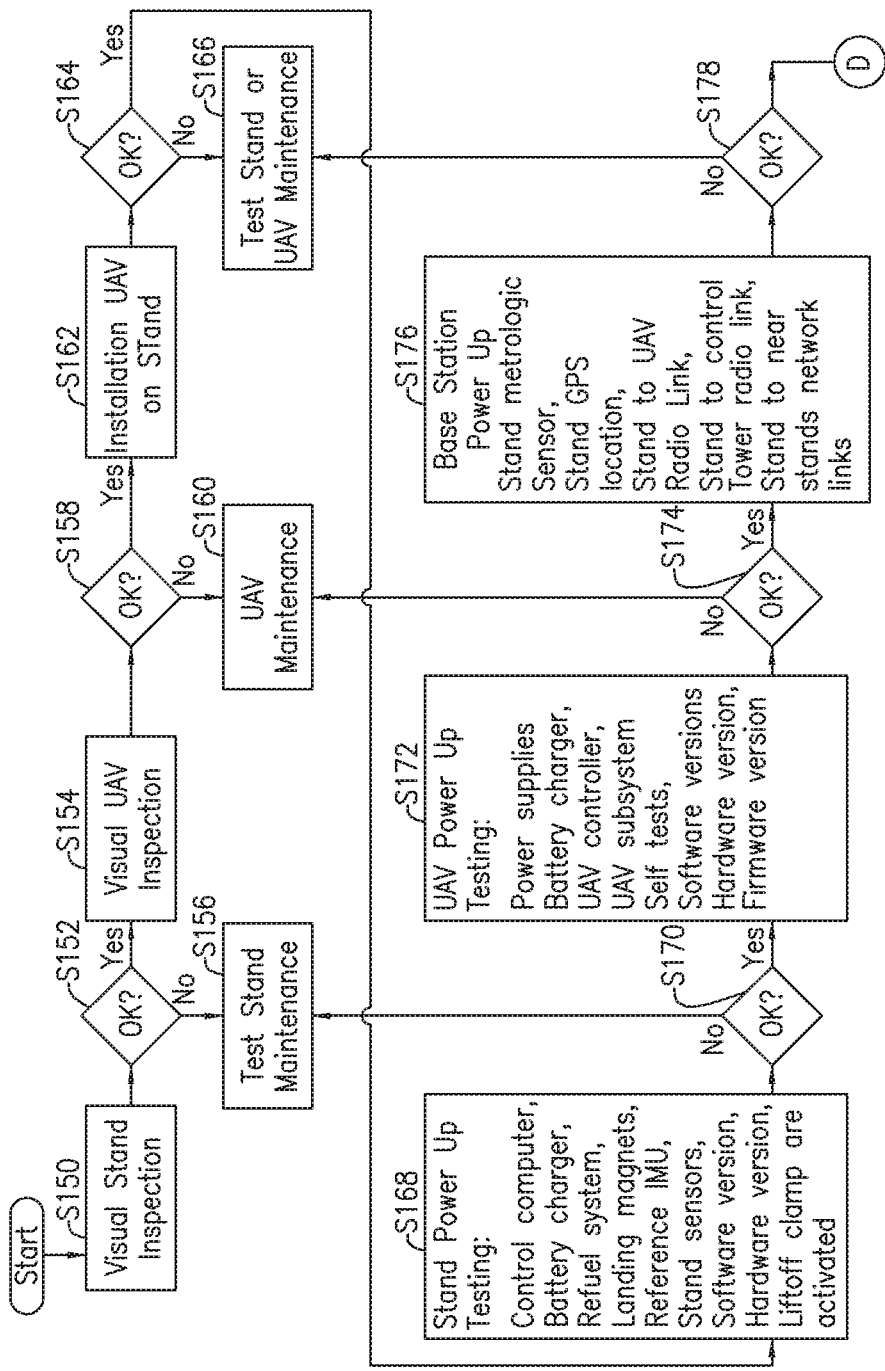
FIG. 21 is a flowchart of first and second operational levels of a launch procedure.

FIG. 21 is a flowchart of first and second operational levels of a UAV launch procedure according to some embodiments. A visual inspection of the stand 11 may be performed (block S150). If the visual inspection of the stand 11 checks out OK (block S152), a visual inspection of the UAV may be performed (block S154). If the visual inspection of the stand 11 does not check out OK, then test stand maintenance may be performed (block S156).

Moving to block S158, if the visual inspection of the UAV does not check out OK, then UAV maintenance may be performed (block S160). If visual inspection of the UAV checks out OK, then the UAV is installed on the stand 11 (block S162), if not already installed on the stand 11. If the installation checks out OK (block S164) the process continues to block S168 at launch operational level 2. Otherwise, further maintenance may be performed on the UAV 10 and/or the stand 11 (block S166).

At launch operational level 2, the stand powers up (block S168). Tests may be performed on at least some of the following systems: the control computer (electronics), the battery charger, the refueling system, the landing magnetics, stand sensors, software, hardware, liftoff clamps, etc. If these tests check out OK (block S170), a UAV power-up procedure is performed (block S172). Note that when the UAV is first installed on the stand, a reference IMCU may record readings to verify the UAV IMCU readings during subsequent stand operations. As part of the UAV power up procedure, the UAV battery system may be charged and verification is made that adequate charge is achieved. If these systems do not check out OK (block S170), test stand maintenance may be performed (block S156).

In block S172, at least some of the following UAV systems may be tested: power supplies, battery charge, UAV controller, UAV subsystems, software, hardware and firmware. If these systems check out OK (block S174), a communication base station power-up procedure is performed (block S176). If these systems do not check out OK (block S174), UAV maintenance may be performed (block S160).

In block S176, at least some of the following base station systems may be performed: stand metrological sensors may be checked to verify that operational weather conditions exist prior to takeoff; online weather conditions at the landing location and along the flight path may be verified as well; stand GPS is validated to ensure GPS locations of the UAV and the stand correspond; stand to UAV radio links are checked, as well as stand to fleet network control radio links; stand to near stands network links and all other radio transmissions are validated.

Metrological sensors may include a wind speed, wind gust, cross wind and direction sensor, a temperature sensor, a humidity sensor and barometric air pressure sensor. This information may be processed as part of flight planning with the stand and/or base station. If these tests do not check out OK (block S178), further maintenance may be performed. If these tests do check out OK, the process continues to launch operational levels 3 and 4, as shown in FIG. 22.

Figure 22:
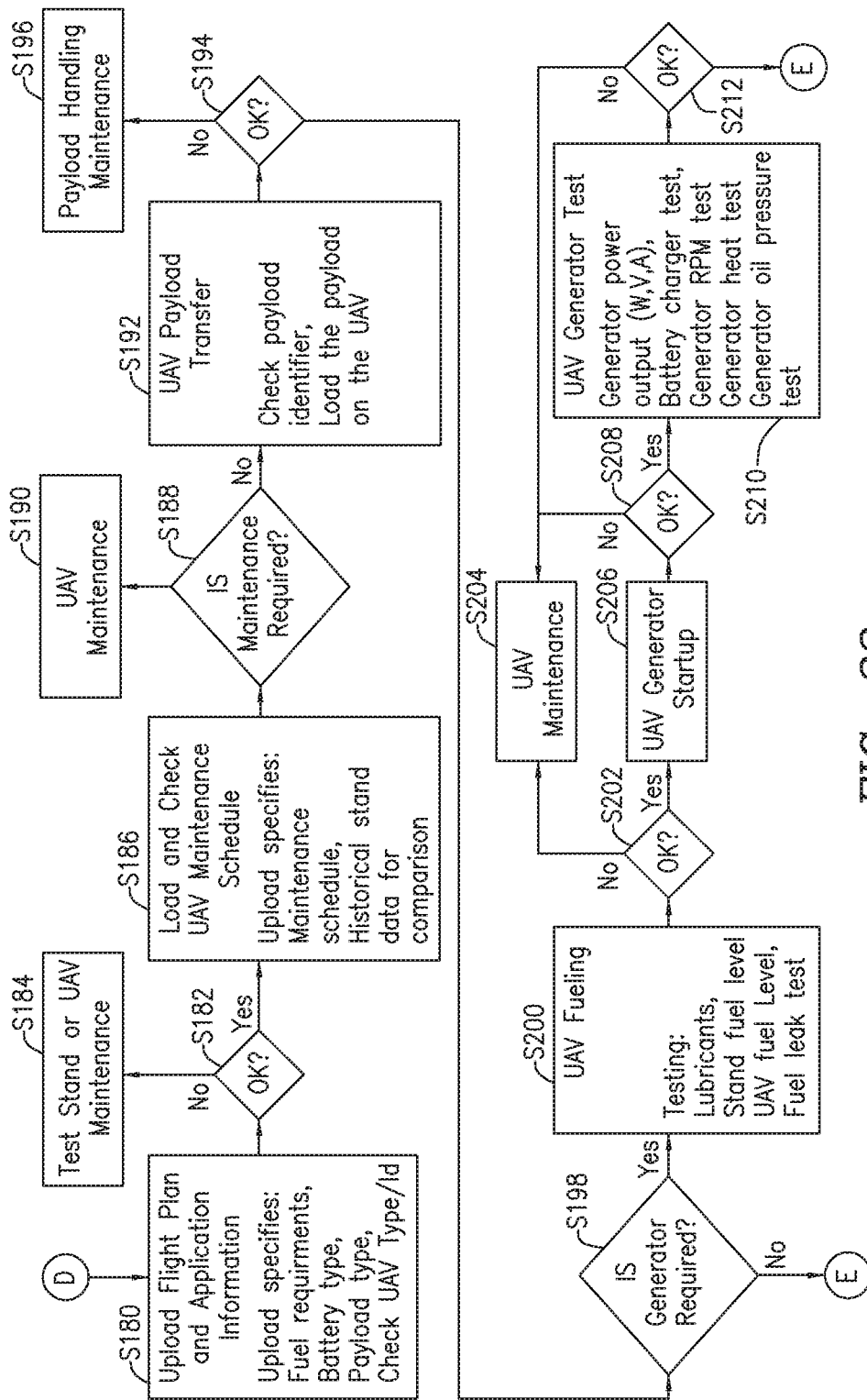
FIG. 22 is a flowchart of third and fourth operational levels of a launch procedure.

In FIG. 22, a flight plan and application information is uploaded to the UAV 10 (block S180). This information may include at least some of the following: navigation instructions, fuel requirements, battery type, payload type, UAV type/ID. If the upload does not succeed (block S182), maintenance may be performed (block S184). If the upload succeeds, a UAV maintenance schedule may be uploaded and checked (block S186). This may include historical data concerning the stand 11 for comparison. If, according to the maintenance schedule, maintenance is required (block S188), UAV maintenance may be performed (block S190).

Otherwise, the process continues to block S192, where a UAV payload is transferred to the UAV. This process may include at least some of the following: checking a payload identifier and a payload weight, loading the payload onto the UAV, and verifying a satisfactory weight distribution. If the payload transfer procedure is not OK (block S194), payload handling maintenance may be performed (block S196). Otherwise, the procedure continues to the fourth operational level of the launch procedure.

Figure 23:
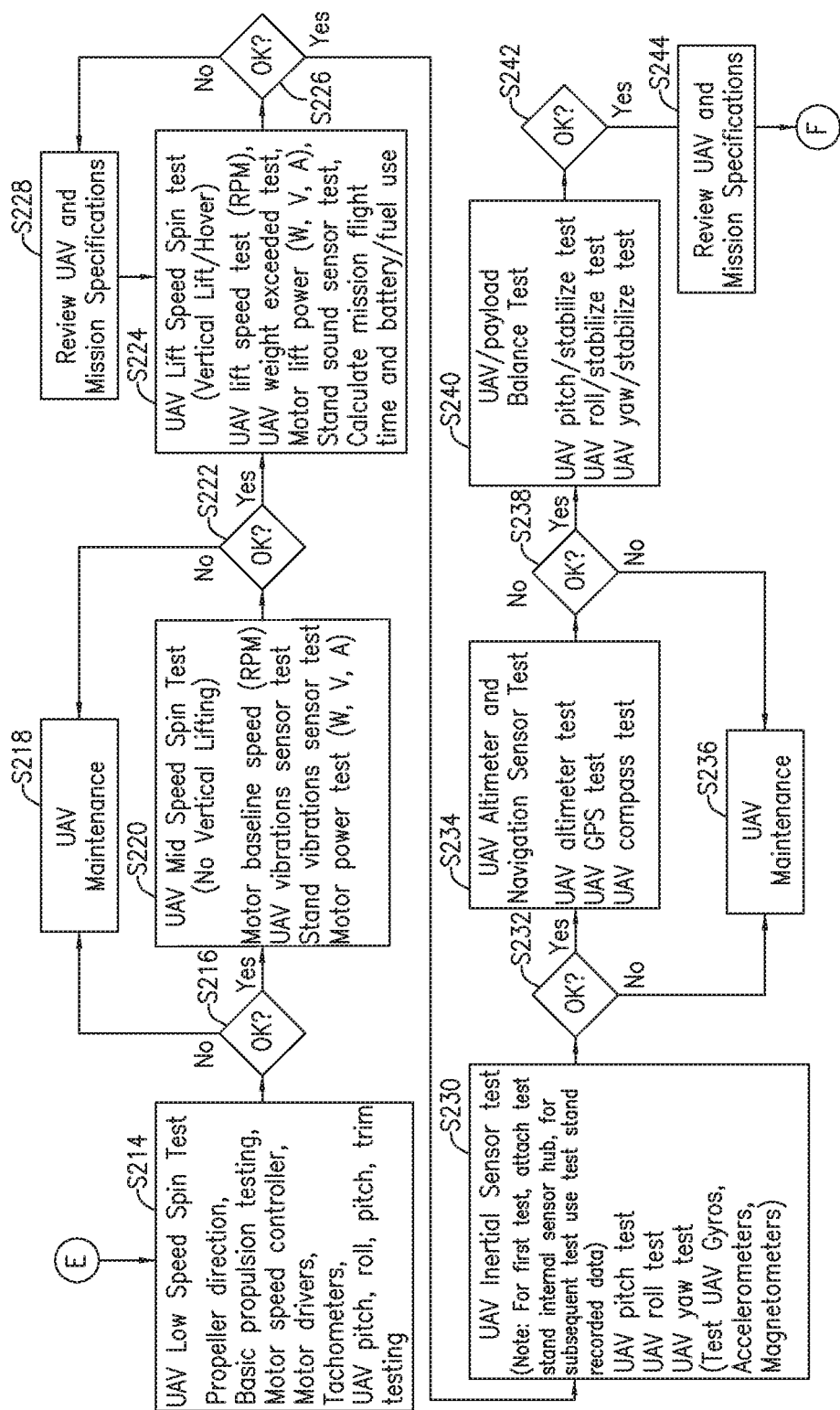
FIG. 23 is a flowchart of fifth and sixth operational levels of a launch procedure.

At block S198, a determination is made whether a generator is used by the UAV 10. If not, the process continues to operational level 5, as shown in FIG. 23. If a generator is used by the UAV, then UAV fueling may be performed (block S200). In this block, lubricants may be applied, a fuel level of the stand 11 may be determined, a notification is sent to the UAV, base station or support personnel if more fuel is needed, and a fuel level of the UAV 10 may be determined, a fuel leak test may be performed, and the UAV 10 may be refueled. If the procedures of block S200 are not complete or there is a problem (block S202), then UAV maintenance may be called for (block S204).

Otherwise, the generator of the UAV 10 may be started (block S206). If the generator does not start (block S208), UAV maintenance may be performed. If the generator starts OK, generator tests may be performed (block S210). The generator tests may include at least some of the following: generator power output test (watts, volts and/or amps), battery charging test, generator RPM test, generator heat test, and a generator oil pressure test. If these tests are not OK (block S212), then UAV maintenance may be performed. Otherwise, the process continues to operational levels 5 and 6, as shown in FIG. 23.

In FIG. 23, a UAV low speed spin test may be performed (block S214). These tests may include at least some of the following: propeller direction testing, basic propulsion testing, motor testing, speed controller testing, motor driver testing, tachometer testing, UAV pitch, roll and pitch trim testing. If these tests are not OK (block S216), UAV maintenance may be performed (block S218). Otherwise, the process may continue to UAV mid-speed spin tests (block S220).

In block S220 the mid-speed spin tests may be performed such that there is no vertical lifting. The mid-speed spin tests may include at least some of the following: motor baseline speed test, UAV vibration sensor test, stand vibration sensor test, motor power tests (watts, volts and/or amperes), IR or audible signature comparison tests. If these diagnostic tests are not OK (block S222), then UAV maintenance may be performed.

Otherwise, the process may continue to UAV lift speed spin tests (block S224). These tests may involve the UAV 10 performing a vertical lift and hover while on the stand, and may include at least some of the following: a UAV lift speed test (RPM), UAV weight-exceeded test, a motor lift power test (watts, volts and/or amperes), a sound level test by the stand sound sensor, a mission flight calculation, a time and battery/fuel use test.

Meteorological data may be factored into calculations used for flight time and fuel projections. The UAV flight path and stand hops may be altered to match the UAV endurance determined by the high speed lift tests. If these tests are not OK (block S226), a review of UAV and mission specifications may be made (block S228). If these tests are OK, then the process continues to operational level 6.

A test of UAV inertial sensors may be performed (block S230). In a first test of the UAV inertial sensors testing, recorded test stand data may be used to compare and verify UAV inertial settings. The tests may include pitch, roll and yaw tests, tests of UAV gyroscopes, accelerometers and magnetometers. Similarly, IR and audible signatures of the UAV 10 may be compared to previous baselines to determine if potential UAV operation issues exist. If these tests are OK (block S232), the process continues at block S234.

Otherwise, UAV maintenance may be performed (block S236). At block S234, a UAV altimeter and navigation sensor test may be performed. These tests may include an altimeter test, a GPS test and a compass test. If these tests are not OK (block S238), then UAV maintenance may be performed. Otherwise, the process continues to a UAV payload balance test (block S240). These tests may include a pitch/stabilize test, a roll/stabilize test, and a yaw/stabilize test. If these tests are not OK (block S242), a review of UAV and mission specifications may be performed (block S244). Otherwise, the process continues to operational level 7, as shown in FIG. 24.

Figure 24:
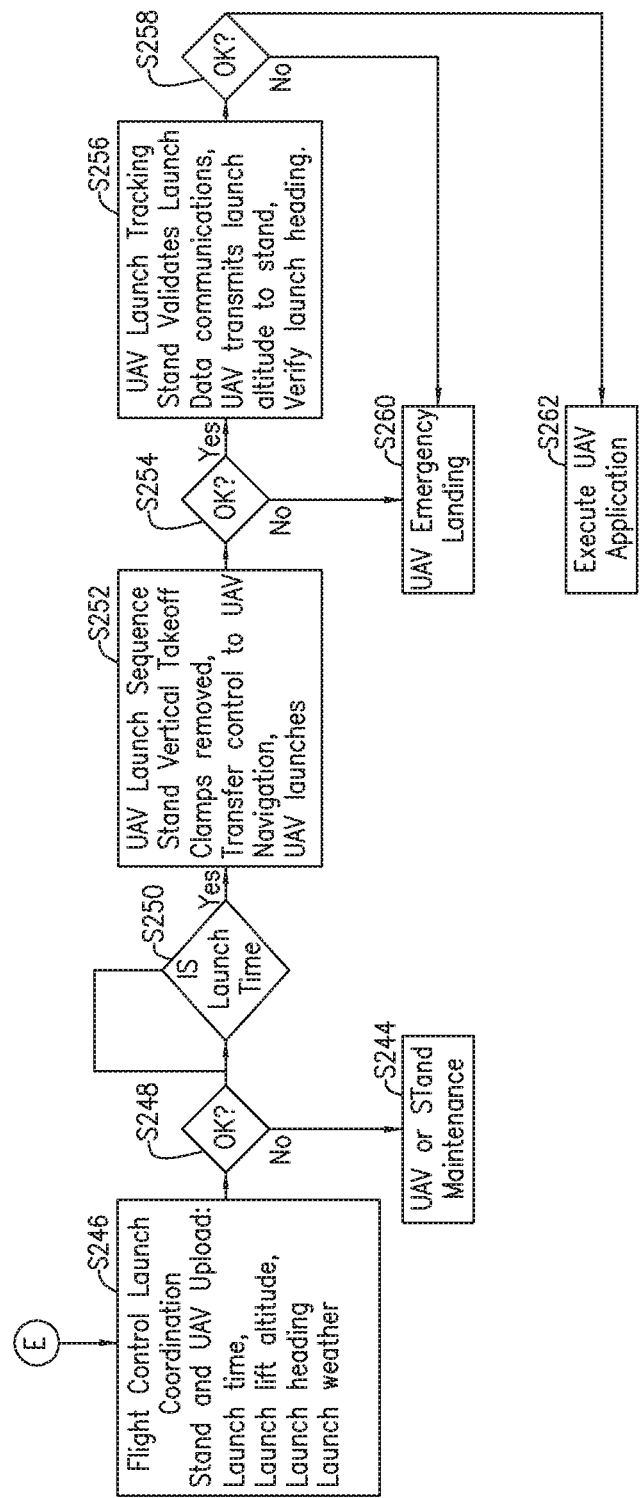
FIG. 24 is a flowchart of a seventh operational level of a launch procedure.

In FIG. 24, a flight control launch coordination procedure may be performed (block S246). This procedure may include an upload to the UAV 10 and stand 11, a launch time, a launch lift altitude, a launch heading and launch weather. If the procedure is not OK (block S248), then UAV or stand maintenance may be performed (block S249). Otherwise, if it is time for launch (block S250), then a UAV launch sequence is performed (block S252). This sequence may include removing stand vertical takeoff clamps 82, transfer of control to the UAV 10 navigation. If these procedures are not OK or the UAV cannot or does not launch (block S254), then a UAV emergency landing may be performed.

Otherwise, UAV launch tracking is performed (block S256). In the launch tracking procedure, the stand 11 validates launch of the UAV 10, tests data communications, the UAV 10 transmits launch altitude to the stand 11 and launch heading is verified. If these steps do not check out OK (block S258), then the UAV 10 may execute an emergency landing. Otherwise, a UAV flight application may be executed (block S262).

Note that a historical log of steps taken in the processes of FIGS. 16-24 may be stored in a repository located at the stand and/or remote from the stand. In some embodiments, the stand 11 utilizes a predictive diagnostic maintenance system to review test results and compare them to historical records of previous landings and launches to determine if the reviewed results are within statistical error boundaries of previous landings and launches of similar UAVs loaded with different or similar payloads. The predictive diagnostics may include analysis of inertial, power, IR, audible, vibrational and other UAV and stand sensor inputs to determine validity and operation within statistical norms of other UAV launches.

For example, the stand 11 may use a predictive diagnostic maintenance system to review test results of operational levels 5, 6 and 7 of the launch procedures described in FIGS. 23 and 24, and compare these results to historical records of the specific UAV being ready to launch, to determine if there are significant statistical differences from previous launches of the same UAV when loaded with similar payloads. The error bounds in such a comparison may be more restrictive than when comparing launch data of dissimilar UAVs and/or payloads.

Figure 25:
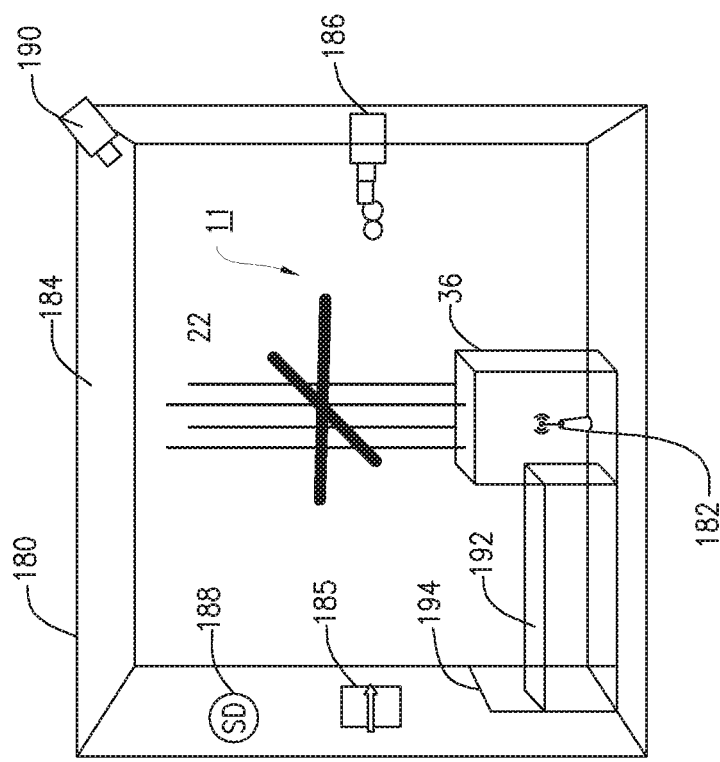
FIG. 25 is an illustration of stand within an enclosure.

FIG. 25 is a diagram of a stand 11 within an enclosure 180 referred to herein as a drone dome. The stand 11 is shown with a drone (UAV) 10 supported by the shafts 22 which are supported by a base structure 36 as described above with reference to FIGS. 3 and 4. Element 182 represents sensors, RF transceivers and antennas as described above, and also represents warning lights to flash when a hazardous condition exists. Such hazardous conditions may include a door of the drone dome 180 being open, personnel within the drone dome 180, as detected by motion sensors 185 and/or infrared sensors 186, for example, when a UAV 10 is landing or launching, or the roof or surface 184 is closed when a UAV 10 is attempting to land or launch, or there is smoke or fire detected by a smoke detector 188 within the drone dome 180.

Cameras 190 may also be employed to detect conditions within the drone dome 180 and to monitor activities therein. Some embodiments may include a 3 dimensional video/scanning system to detect personnel within the drone dome 180. Note also that heat sensors may be installed within the drone dome 180 to detect a heat signature of a motor or electronics of the UAV 10.

Within the drone dome 180 may be a material handling system 192 which may include a conveyor belt to facilitate adding or removing a payload to or from the UAV 10. A window 194 may be in one side of the drone dome 180 to pass payloads there through. In addition to the conveyor belt, or in the alternative, a chute may be provided to receive a package released from the UAV and to direct the package to a bin or to a conveyor belt. The package may be delivered or released into a drop box that is physically secure and cannot be opened by a person without a key or combination, to deter theft or vandalism.

Figure 26:
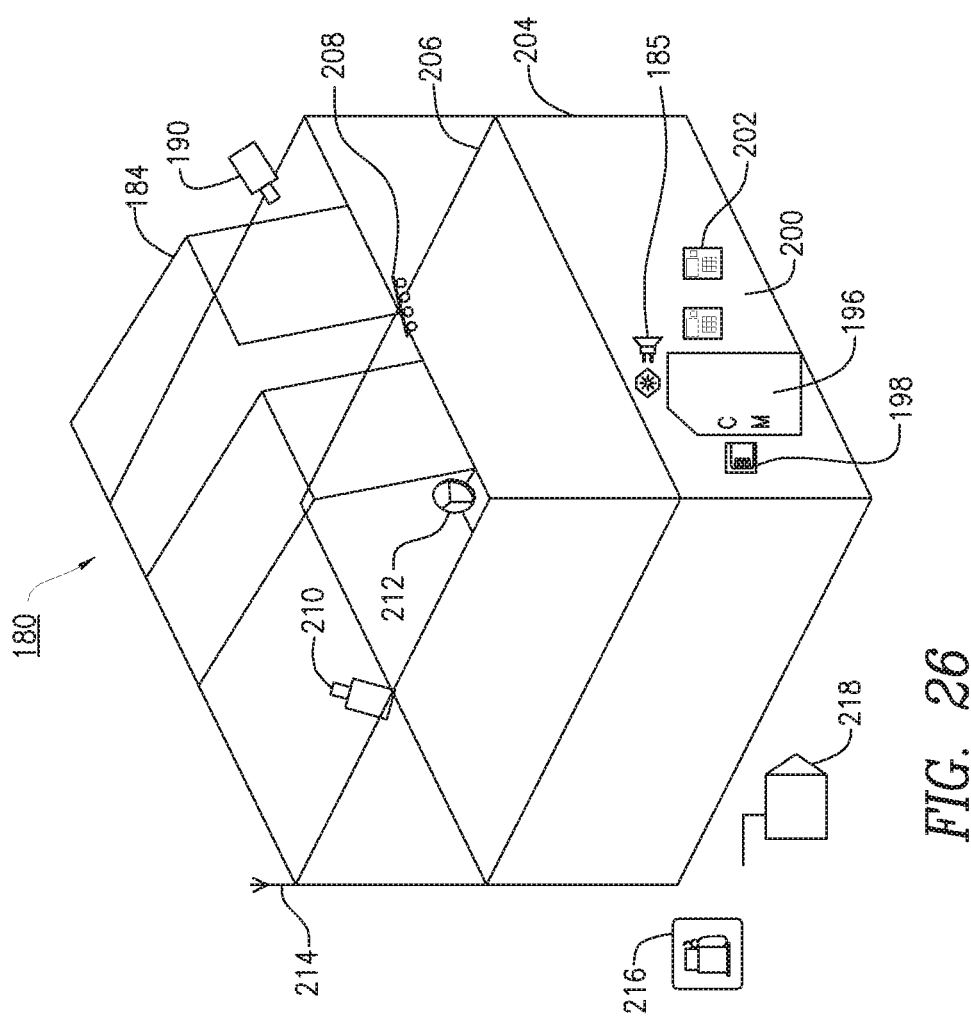
FIG. 26 is an illustration of an enclosure with a retractable roof.

FIG. 26 is an illustration of an exterior of the drone dome 180 having a retractable roof or surface 184. Not that the surface 184 may have opening in the top or side to allow a UAV 10 to pass through. An audible alarm/speaker 185 may be mounted near an access door 196. The speaker may sound an alarm and a light may flash on the exterior of the drone dome 180 to warn that a hazardous condition exists within the drone dome 180. An electronic interlock 198 is for locking and unlocking the door 196. The electronic interlock may be activated when a hazardous condition exists within the drone dome 180. The door 196 may then be locked from opening from the outside but enable opening from the inside to allow escape but prevent entry.

A keypad, card reader, RFID reader or biometric sensor 200 is provided for authentication and authorization to enter the drone dome 180, and a roof access control keypad, card reader, RFID reader or biometric sensor 202 is provided for authentication and authorization to open and close the retractable roof 184.

The drone dome 180 may be composed of a base structure 204 with netted sides and a lightweight top frame 206 that may be enclosed with netting. In some embodiments, the drone dome 180 may be constructed of lightweight plastic or carbon fiber shafts that can be raised to increase the height of the drone dome 180. Note that some embodiments may not include a retractable roof 184. Note also that in some embodiments, the netted roof and sides may be raised or lowered as needed for maintenance, stand placement or removal, or drone placement or removal. In some embodiments an access door may be provided for stand placement or removal or drone placement or removal from or to the drone dome 180.

Station lighting 208 may be mounted to or near or on the drone dome 180. One or more flight observation cameras 210 may be positioned at the top of the drone dome 180 to enable remote observation of UAVs approaching or departing from the drone dome 180. A tracking antenna 212 may be provided to track one or more UAVs by RF or light wave detection and ranging. A radio control antenna 214 may be provided to communicate control signals and position data to one or more UAVs. Inside or outside the drone dome 180 may be a fluid tank and pump 216 and a power generator 218 for recharging a UAV 10.

The drone dome 180 may be used for delivery operations, research and testing, certification activities, recreation (such as racing, obstacle courses other competitions), emissions and RF interference testing, particularly if the drone dome 180 is constructed as a Faraday cage. Note also that the dimensions of the drone dome 180 may be uploaded to the UAV 10 to aid in navigation.

Figure 31:
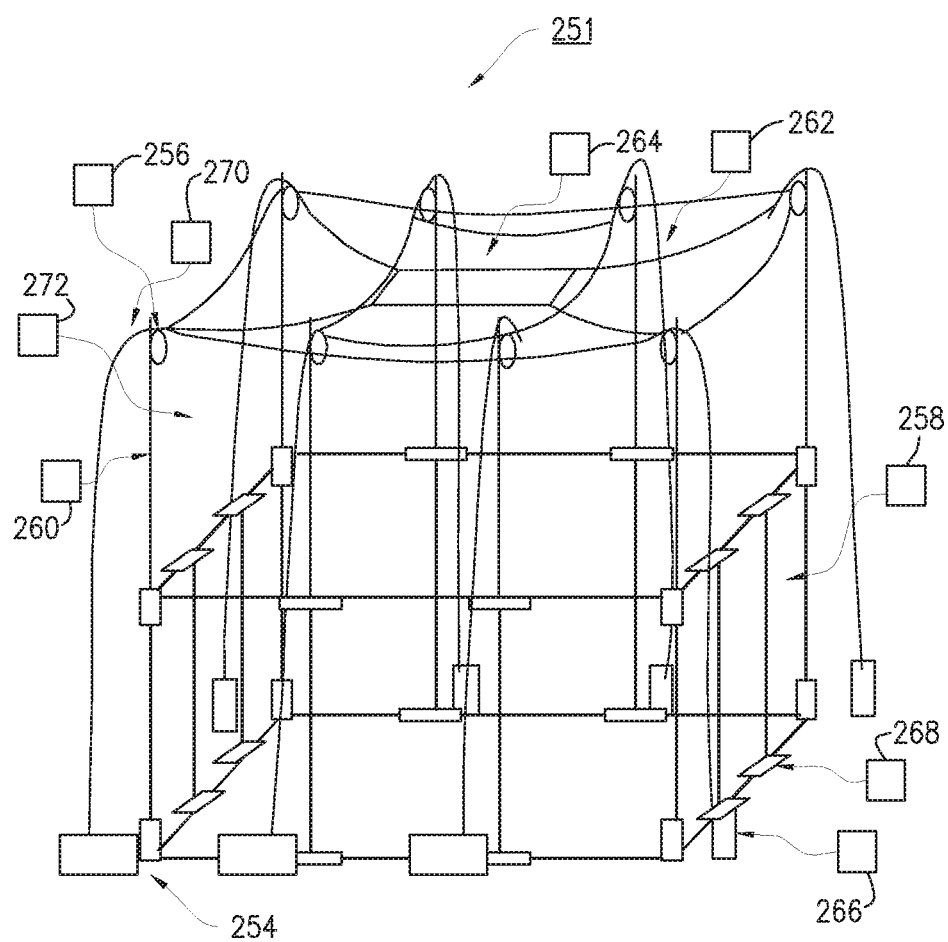
FIG. 31 is a diagram of an enclosure with retractable net.

FIG. 31 is another embodiment of a drone dome 251. Motors 254 can be used with a pulley and rope system to raise and lower sides and roof of the drone dome 251. Pulleys 256, for example, one for each corner, may be provided to facilitate raising the sides and roof. Modular stand sections 258 made from, for example, metal and carbon fiber frames, may be employed as lower sides of the drone dome 251. Telescopic poles 260 enable adjustment for a range of heights.

A net roof 262 may have a large hole in the middle or off to one side to enable a UAV 10 to enter and leave the drone dome 251. A sliding net door 264 may be used to close or open the hole in the net roof 262. Ground stakes 266 can be placed in the ground or secured by sand bags to secure the drone dome 251. Brackets 268 may be employed to secure the modular stand sections 258 together. Rope 270 may be provided to pull the roof over or off of the top of the drone dome 251. A net or plastic mesh 272 may be employed to enclose the entire drone dome 251 or a portion thereof.

Figure 27:
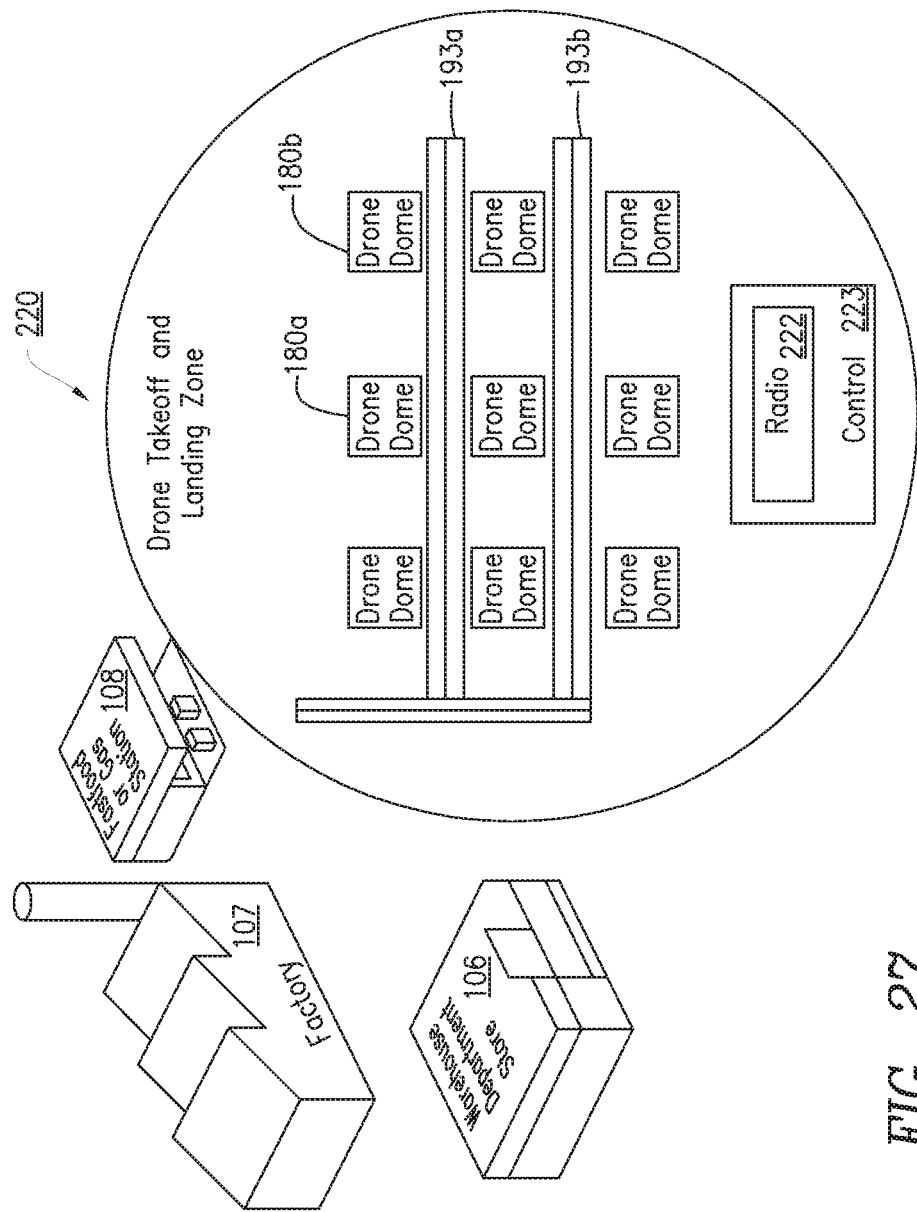
FIG. 27 is an illustration of a take-off and landing zone.

FIG. 27 depicts a landing zone 220 with a plurality of drone domes 180, each covering a stand 11, and each in mechanical communication with a conveyor 193 for movement of payloads, material and equipment to and from a stand 11. In some embodiments, within the drone dome 180 coupled with a stand 11 may be a chute that receives a package from a UAV 10 and transports the package to the conveyor 193. The landing zone may be within the proximity of a UAV site 106, such as a warehouse, a factory 107 or a business or customer premise 108 such as a convenience store or gas station or mechanics station.

Thus, a landing zone 220 may include a plurality of stands 11, each stand enclosed in a drone dome 180. Associated with the landing zone 220 may be a control console 223 having a radio 222 to communicate with the stands 11 and the UAVs 10 to coordinate and facilitate landing and launching of the UAVs 10. The control console 223 may include a computer, a keyboard, a mouse and a video display. The control console 223 may include, be or be contained within a server 110 or radio base station 104. Note that the control console 223 in FIG. 27 is located outside a drone dome 180. In some embodiments, the control console 223 may be located within a drone dome 180.

The control console may, for example, coordinate a UAV landing within one drone dome 180a with a UAV launching from a different drone dome 180b. Note that different ones of the drone domes 180 may provide different services, such as refueling, UAV repair, UAV maintenance, UAV recharging, UAV lubrication, etc. These services may be indicated at the control console 223. Note that the distribution of drone domes 180 and stands may be based on terrain, characteristics of a physical plant, delivery and receiving points, and as such, may be linearly distributed, distributed in a cluster or other distribution.

Figure 28:
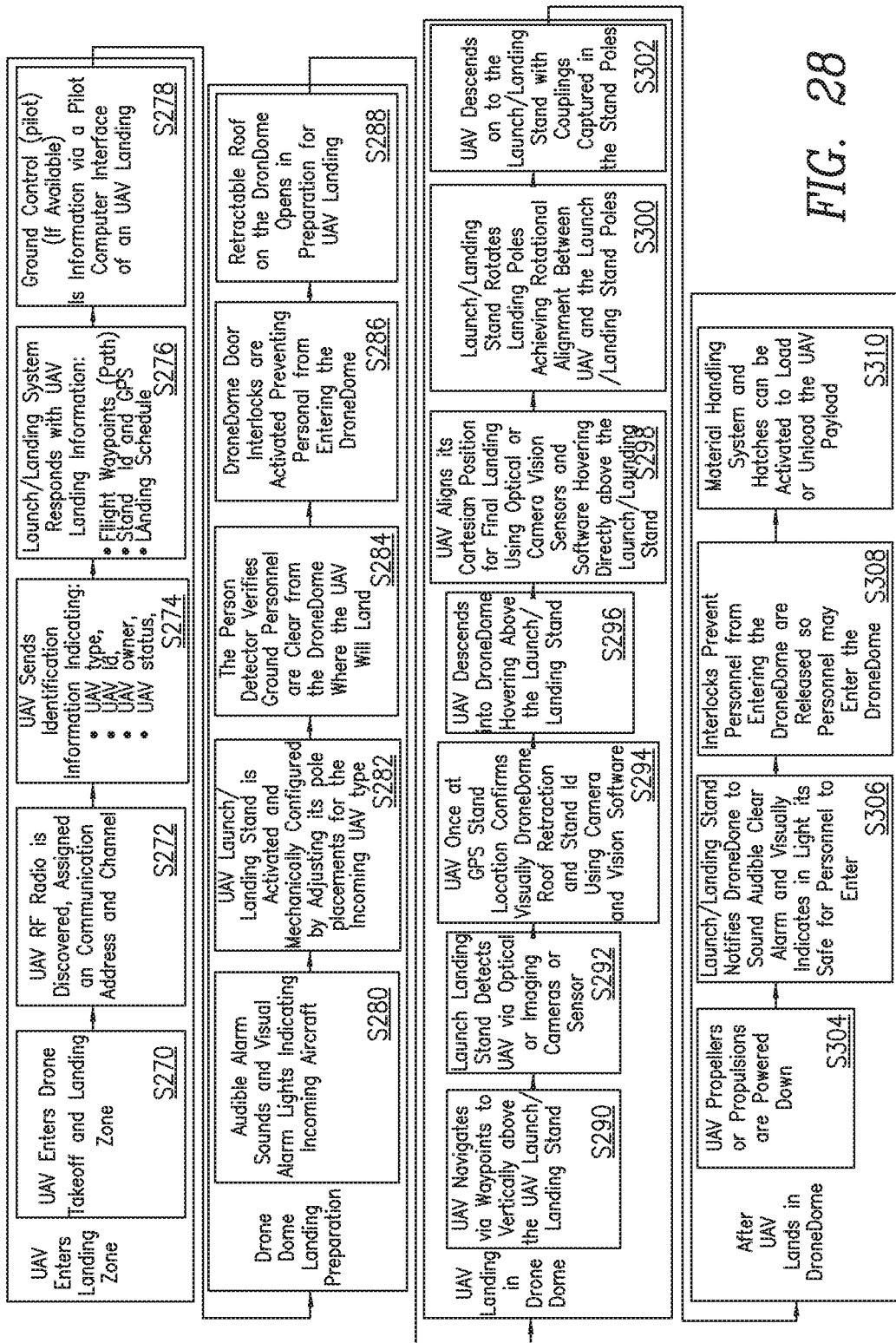
FIG. 28 is a flowchart of an exemplary process of landing a UAV within a drone dome.

FIG. 28 is a flowchart of an exemplary process for landing a UAV 10 within a drone dome 180. Some of these steps may duplicate, replace or add to the steps of FIGS. 17-20. Similarly, some of the steps of FIGS. 17-20 may duplicate, replace or add to the steps of FIG. 28. In FIG. 28, a UAV 10 enters a drone take-off and landing zone 220 (block S270). In some embodiments, a radio of the UAV 10 is discovered by the radio 222 associated with the landing zone 220 and is assigned a communication address and radio channel to communicate with one of the stands 11 in the landing zone 220 (block S272).

The UAV 10 sends identification information to the assigned stand 11 on the assigned radio channel (block S274). This identification information may include UAV type, UAV identification number, UAV owner and UAV status. A radio of the stand 11 communicates landing information to the UAV 10 (block S276). This landing information may include a flight path, stand identification number, GPS position of the stand, and a landing schedule. In some embodiments, a ground control pilot of the stand 11 is informed of the approaching UAV 10 (block S278).

In preparation for landing the UAV 10, an audible alarm 185 of the drone dome 180 sounds and a visual indicator such as a flashing light 182 is activated (block S280). The UAV stand is actuated and its shafts 22 adjusted for the type of UAV that is landing (block S282). The personnel detectors 184, 186, 190 verify whether ground personnel are or are not within the drone dome 180 (block S284). The drone dome interlocks 198 are activated to prevent the door 196 from opening during the landing process (block S286). The retractable roof 184 of the drone dome 180 is opened in preparation for landing (block S288).

The UAV 10 navigates according to the flight path provided by the stand 11 in block S276 to be positioned directly above the stand 11 (block S290). The stand 11 detects the UAV 10 via RF and/or optical sensors and/or cameras (block S292). In some embodiments, the UAV may be equipped with its own sensors to detect whether the retractable roof 184 is open (block S294). The UAV 10 descends into the drone dome area and may hover above the stand 11 (block S296). The UAV 10 may align its Cartesian coordinate system for final landing using sensors and software (block S298). The stand 11 may rotate the shafts 22 to achieve rotational alignment between the collars 16 of the UAV 10 and the shafts 22 (block S300). The UAV 10 lowers onto the stand 11 such that the collars 16 are captured by the shafts 22 (block S302).

The UAV propulsion system is powered down (block S304). The stand 11 notifies control circuitry of the drone dome that the audible alarm 185 is to be turned off and a visual indication of landing or launching is to cease, indicating that it is safe for personnel to enter the drone dome (block S306). The interlock 198 is released so that personnel may enter the drone dome (S308). The material handling system 192 may be activated and the hatch 294 may be opened to load or unload payload (block S310).

Figure 29:
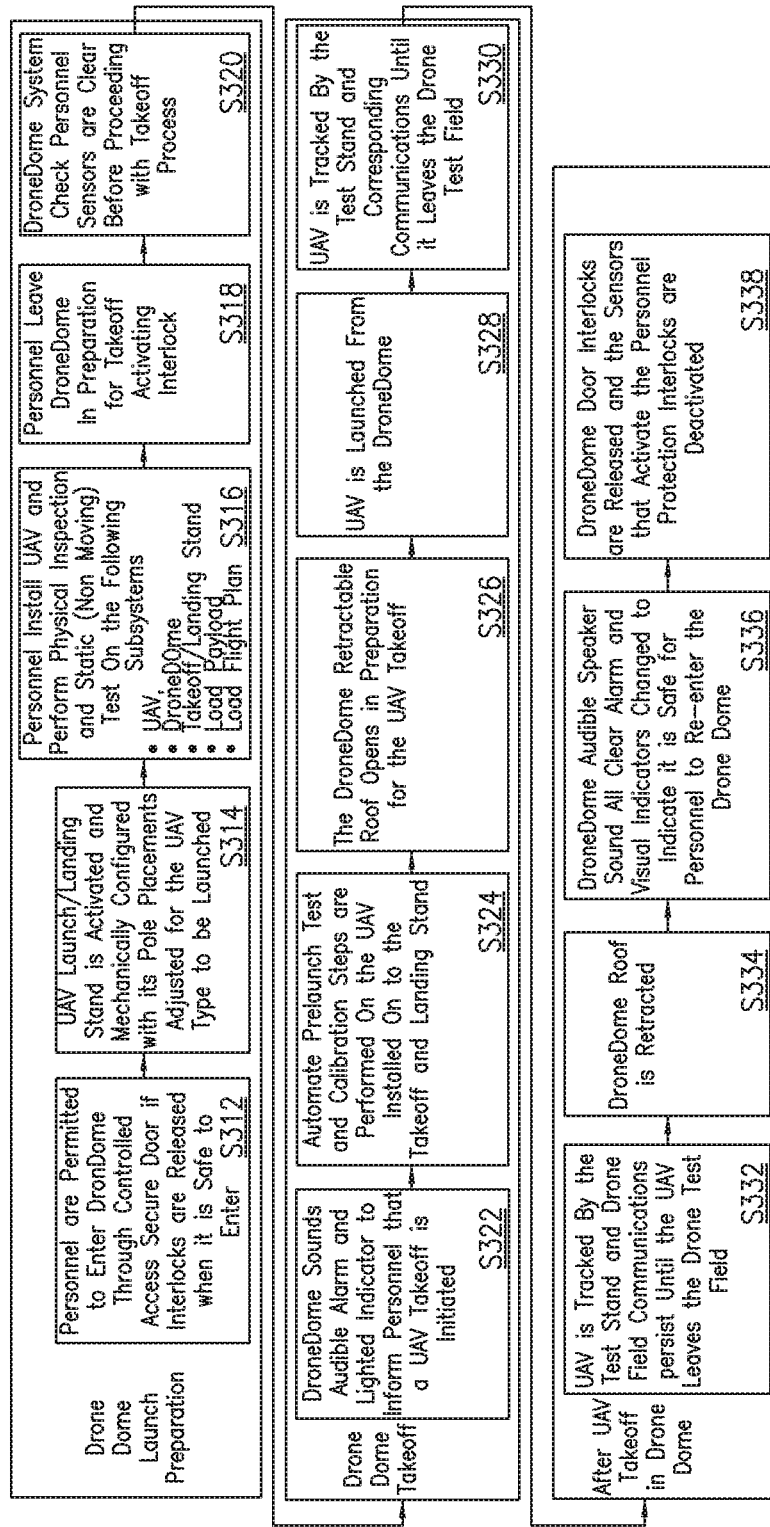
FIG. 29 is a flowchart of an exemplary process of launching a UAV from a drone dome.

FIG. 29 is a flowchart of an exemplary process for launching a UAV 10 from a stand 11 and a drone dome 180. Some of the steps of FIG. 29 may duplicate, replace or add to the steps of FIGS. 21-24. Similarly, some of the steps of FIGS. 21-24 may duplicate, replace or add to the steps of FIG. 29. In preparation for launch, personnel are permitted to enter the drone some 180 via the access door 196 (block S312). The stand 11 is activated and mechanically configured to adjust the shafts 22 to fit the UAV 10 to be launched (block S314). Personnel install the UAV 10 and perform physical inspection of subsystems including the UAV 10, the drone dome 180, the stand 11, the payload and the flight plan (block S316). Personnel leave the interior of the drone dome 180 in preparation of takeoff and the electronic interlock 198 is activated to lock the access door 196 (block S318). Sensors of the drone dome 180 check to ensure that no personnel are inside (block S320).

The drone dome 180 activates audible and visual alarms to inform personnel that a launch is to be initiated (block S322). Automatic prelaunch tests are performed on the UAV (block S324). The drone dome roof 184 opens in preparation for takeoff (block S326). The UAV 10 is launched from the drone dome 180 (block S328). The UAV is tracked by the stand 11 and corresponding communications occurs as the UAV leaves the drone launch area (block S330). The drone dome roof 184 is retracted to a closed position (block S334). The drone dome speaker and visual signal indicate that entry into the drone dome interior is safe (block S336). The drone dome interlocks are released to allow entry to the drone dome interior (block S338).

The UAV 10 or the stand 11, in communication with the UAV 10, may be installed with an LED panel that may indicate one or more of the following:
Not ready to fly payload overweight
Not ready to fly payload imbalance
Not ready to fly payload auto trim error
Not ready to fly motor/controller fault
RC controller calibration error
RC controller battery low error Mission ready
Mission programmed
Mission disconnected
Automatic Landing These indicators may also or alternatively be installed as part of the drone drive electronics to be described subsequently.

Figure 30:
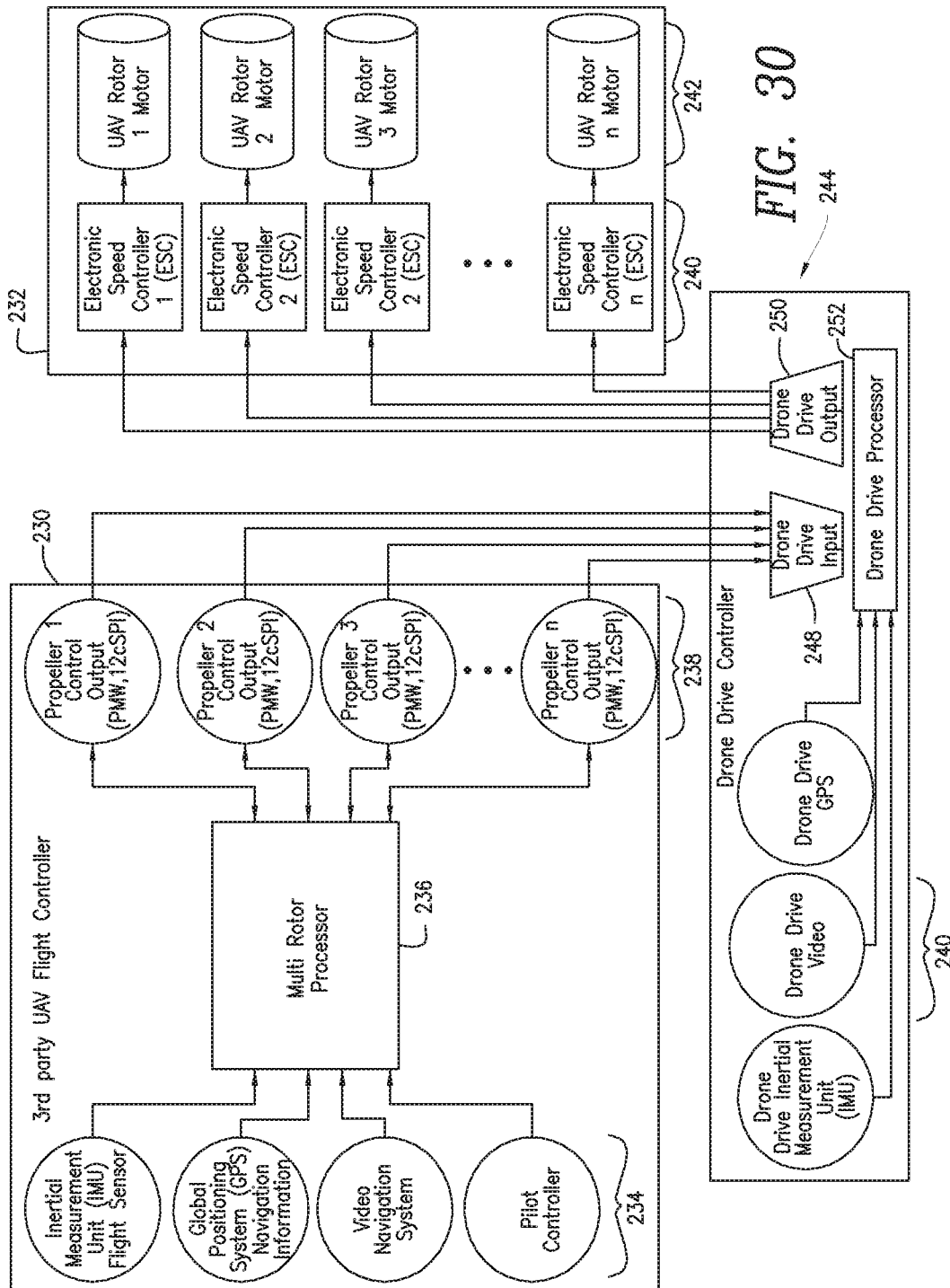
FIG. 30 is a block diagram of drone drive electronics.

FIG. 30 is a block diagram of UAV 10 having resident control electronics 230 and a propulsion system 232 that includes motors and electronic speed circuits (ESCs). The control electronics 230 may include sensors 234, a multi-rotor processor 236 and propeller control outputs 238. The propulsion system 232 includes the ESCs 240 and rotor motors 242 that drive the propellers 12 of the UAV 10. Installable on the UAV 10 is a drone drive controller 244 having drone drive electronics that include sensors 246, input and output ports 248 and 250, and a drone drive processor 252. The drone drive controller 244 may be embedded on a printed circuit card that may be remove-ably installable on the UAV 10. In some embodiments the drone drive controller 244 may be interposed between the resident control electronics 230 and the propulsion system 232 of the UAV 10. In some embodiments, the drone drive controller may be a printed circuit board or integrated circuit with leads that plug into a receptacle of the UAV electronics such as the control electronics 230.

When the UAV 10 is in flight and not landing or launching at a stand 11, the UAV resident control electronics 230 are coupled directly to the UAV propulsion system 232 via a bypass through the drone drive controller 244. In this normal flight mode, the propulsion system 232 of the UAV 10 is controlled by the resident electronics 230 without input from the drone drive controller 244. Rather, the output signals of the control outputs 238 are fed through the drone drive controller 244 without being processed by the drone drive processor 252. In this pass through mode during normal flight between destinations, the output signals of the control outputs 238 directly control the ESCs 240 of the propulsion system 232, which in turn control the speed of the rotor motors 242.

In contrast, when the UAV 10 is landing or launching at the stand 11 or being operated in a test mode, the stand 11 may send a signal to the UAV 10 causing the activation of a switch of the drone drive controller 244 to selectively couple the drone drive electronics to the UAV propulsion system 232. The switch and the communications interface that enable the stand 11 to switch modes of operation of the UAV 10 are not shown in FIG. 30 but may be included onboard the drone drive electronics circuit card or package. In some embodiments, the UAV 10 resident electronics may include the communication interface that receives the signal from the stand 11 to switch modes of operation of the UAV 10.

In one mode of operation, the drone drive controller generates its own control signals that are output to the propulsion system 232 and the control signals from the resident electronics 230 are ignored. In this mode, the drone drive controller assumes complete control of the propulsion, and hence, the navigation, of the UAV 10. The drone drive sensors 246 may be more precise than the sensors 234 of the resident electronics 230, and algorithms executed by the drone drive processor 252 may be especially adapted to control or influence flight of the UAV 10 during landing and launching procedures. In this way, existing and new UAVs need not be redesigned to especially adapt to the stand 11. Rather, the drone drive controller 244 may be remove-ably installed on the UAV 10 to adapt the UAV 10 to the stand 11.

Note that in another mode of operation, during launch or landing or test, the drone drive controller 244 merely supplements and further processes the signals from the resident electronics 230. Thus, in some embodiments, the drone drive controller 244 operates to perturb the signals to the ESCs 240 from the resident control electronics 230. Thus, the drone drive electronics may be configured to perturb signals of an inertial drive system of the UAV 10; may be configured to perturb signals of a flight control system of the UAV 10; and/or may be configured to alter a position determination to cause an alteration in navigation of the UAV.

Thus, during landing, launching and test, drone drive sensors 246 may provide information concerning UAV height, roll, pitch and yaw which enable the UAV 10 to determine its position relative to the shafts 22 of the stand 11, and enable the UAV 10 to alter its attitude with respect to the stand 11. The drone drive sensor information may be supplemented by information from the stand 11 and/or the UAV resident control electronics 230. In some embodiments, a housing which encloses the drone drive electronics and sensors 236 may include the collars 16 and/or the reflectors 18 discussed above. Note that in some embodiments, when a pilot of the UAV takes control of flight, the drone drive controller yields control to the resident control electronics 230.

Some of the embodiments described herein may be implemented as software executed by a processor or by application specific integrated circuitry. It will be appreciated by persons skilled in the art that the some embodiments are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A stand configured to receive an aerial vehicle, the stand configurable to operate in a network of stands within a landing zone, the stand capable of receiving the aerial vehicle, the stand comprising:
   a communication system configured to enable communication with the aerial vehicle and at least one of another stand in the network of stands, a server in communication with at least one other stand in the network of stands, and a radio base station in communication with at least one other stand in the network of stands;
   a processor in communication with the communication system and configured to:
   process information received from the aerial vehicle by the communication system; and
   control at least one of a launching and landing of the aerial vehicle based at least in part on an acquisition and takeover of continuous control of flight of the aerial vehicle during an interval of time when the aerial vehicle is one of landing at and launching from the stand, the acquisition and takeover of continuous flight control including selecting drone drive electronics of the aerial vehicle, the drone drive electronics being bypassed when not selected.

2. The stand of claim 1, wherein the communication system is further configured to transmit position information to the aerial vehicle during flight of the aerial vehicle.

3. The stand of claim 1, wherein the processor is further configured to authenticate and authorize the aerial vehicle to use services provided by the stand.

4. The stand of claim 1, wherein the processor executes a flight course determination algorithm to determine a time of landing of the aerial vehicle in coordination with launchings and landings of a plurality of other aerial vehicles at other stands.

5. The stand of claim 4, wherein the flight course determination algorithm is configured to determine a time of landing of each of the plurality of other aerial vehicles to maximize use of a plurality of stands.

6. The stand of claim 1, wherein the processor executes a flight course determination algorithm to distribute launching and landing of a plurality of aerial vehicles in proximity to the stand to maximize a spacing between the plurality of aerial vehicles in proximity to the stand.

7. The stand of claim 4, wherein the processor executes the flight course determination algorithm to minimize a number of at least one of landings and launchings of a plurality of aerial vehicles in a time interval.

8. A server configured to interoperate with a plurality of stands within a landing zone, each stand of the plurality of stands configured to provide at least one of landing and launching services to an aerial vehicle, the server comprising:
   a communications interface configured to enable communication between the server, the plurality of stands and the aerial vehicle;
   and
   a processor in communication with the communications interface, the processor configured to control at least one of a launching and landing of the aerial vehicle based at least in part on an acquisition and takeover of continuous control of flight of the aerial vehicle during an interval of time when the aerial vehicle is one of landing at and launching from a stand of the plurality of stands, the acquisition and takeover of continuous flight control including selecting drone drive electronics of the aerial vehicle, the drone drive electronics being bypassed when not selected.

9. The server of claim 8, wherein the communications interface is configured to provide information concerning services to be provided by the stand of the plurality of stands to the aerial vehicle.

10. A method of operating a network of stands within a landing zone, the method comprising:
    receiving at a control location, first information from a stand of the network of stands via a communication interface at the control location; and
    transmitting first information to the stand of the network of stands via the communication interface to control at least one of a launching and landing of the aerial vehicle based at least in part on an acquisition and takeover of continuous control of flight of the aerial vehicle during an interval of time when the aerial vehicle is one of landing at and launching from the stand of the network of stands, the acquisition and takeover of continuous flight control including selecting drone drive electronics of the aerial vehicle, the drone drive electronics being bypassed when not selected.

11. The method of claim 10, wherein the first information includes at least one of a launch time, a launch lift altitude, a launch heading and launch weather.

12. The stand of claim 1, wherein the processor is configured to determine when the aerial vehicle is authorized to land at the stand.

13. The stand of claim 1, wherein the processing circuitry processor is configured to instruct the aerial vehicle to one of hover in vicinity of the stand and land on the stand.

14. The stand of claim 1, wherein the information includes aerial vehicle landing information, the aerial vehicle landing information including at least one of landing heading, a landing time and an approach altitude.

15. The stand of claim 1, wherein the processor is configured to execute a collision avoidance algorithm when the aerial vehicle is on a collision course with another aerial vehicle.

16. The stand of claim 1, wherein the information includes an alignment of the aerial vehicle with the stand.

17. The stand of claim 1, wherein the processor is configured to cause rotation of shafts of the stand to bring the shafts in alignment with the aerial vehicle.

18. The stand of claim 16, wherein the processor is configured to activate shaft alignment magnetics to bring the shafts in alignment with collars of the aerial vehicle.

19. The stand of claim 1, wherein the processor is configured to upload a flight plan to the aerial vehicle.

* * * * *